US012358771B2

(12) United States Patent
Forni et al.

(10) Patent No.: US 12,358,771 B2
(45) Date of Patent: Jul. 15, 2025

(54) TRANSFERRING UNIT FOR TRANSFERRING CAPS AND APPARATUS FOR CAPPING CONTAINERS COMPRISING THAT UNIT

(71) Applicant: KOSME S.R.L. UNIPERSONALE, Roverbella (IT)

(72) Inventors: Lorenzo Forni, Sala Baganza (IT); Gianluca Franceschini, Marmirolo (IT)

(73) Assignee: KOSME S.R.L. UNIPERSONALE, Roverbella (IT)

( * ) Notice: Subject to any disclaimer, the term of this patent is extended or adjusted under 35 U.S.C. 154(b) by 28 days.

(21) Appl. No.: 18/536,389

(22) Filed: Dec. 12, 2023

(65) Prior Publication Data

US 2024/0208786 A1 Jun. 27, 2024

(30) Foreign Application Priority Data

Dec. 21, 2022 (IT) ........................ 102022000026256

(51) Int. Cl.
*B67B 3/062* (2006.01)
*B67B 3/20* (2006.01)

(52) U.S. Cl.
CPC ................ *B67B 3/062* (2013.01); *B67B 3/20* (2013.01); *B67B 2201/017* (2013.01); *B67B 2201/06* (2013.01)

(58) Field of Classification Search
CPC ..... B67B 3/062; B67B 3/20; B67B 2201/017; B67B 2201/06
See application file for complete search history.

(56) References Cited

U.S. PATENT DOCUMENTS

2018/0290841 A1* 10/2018 Ciftci .................. B23K 37/047

FOREIGN PATENT DOCUMENTS

| | | | |
|---|---|---|---|
| EP | 3626677 | | 3/2020 |
| EP | 3626677 | A1 * | 3/2020 |
| IT | MI20121933 | | 5/2014 |

OTHER PUBLICATIONS

Italian Search Report issued in IT 202200026256 on Aug. 8, 2023, 7 pages.

* cited by examiner

*Primary Examiner* — Thanh K Truong
*Assistant Examiner* — David G Shutty
(74) *Attorney, Agent, or Firm* — Chrisman Gallo Tochtrop LLC

(57) ABSTRACT

A transferring unit for transferring caps (82) comprising: a magazine (29); a housing device (7), (8) comprising a first supporting element (31), a first receiving element of a first typology (32) and one of a second typology (33); a movement device (30) comprising a second supporting element (36); a second receiving element of a first typology (37) and one of a second typology (39); a transferring device (10) comprising a movable arm (41). The transferring unit (2) is switchable between a working configuration, in which the transferring device (10) picks up the caps (82) from the first receiving element and positions them on the second receiving element, and a format change-over configuration, in which the movable arm (41) swaps over the first receiving elements, and swaps over the second receiving elements.

14 Claims, 16 Drawing Sheets

TRANSFERRING UNIT FOR TRANSFERRING CAPS AND APPARATUS FOR CAPPING CONTAINERS COMPRISING THAT UNIT

This invention relates to a cap transferring unit and an apparatus for capping containers comprising that unit. In particular, this invention is advantageously applied in the container capping sector whether the containers are filled with a liquid substance, with a solid substance or are empty.

It should be emphasised that hereinafter reference will mainly be made to apparatuses for capping containers, without thereby limiting the scope of the invention to that typology of application: this invention may be applied in any apparatus in which a cap transferring unit is present.

This invention relates in particular to a transferring unit for transferring caps from a pick-up station to an unloading station, advantageously it relates to a transferring unit capable of picking up a plurality of caps placed in an orderly arrangement in the pick-up station and of delivering them to the unloading station with the same arrangement.

In apparatuses in which a cap transferring unit is present it is very common to have to perform a format change-over, so as to be able to transfer caps of different typologies. This need is seen in particular for small plants in which the apparatus, for example an apparatus for capping containers, is intended to work with different caps, at different times.

It should be emphasised that the expression "to perform a format change-over", with reference to the transferring unit in question, means the operation of adapting the unit (and therefore the apparatus which comprises it) to a different typology of caps so as to be able to work on caps of different typology. The number of format change-overs which can be performed determines the general versatility of the apparatus.

In fact, in general on the market there are many typologies of caps which are very different from each other both in their dimensions, and in their structure (for example, simple screw caps rather than dosing caps with a suction tube) and for a same apparatus it is often necessary to be able to operate with multiple typologies of caps which are very different from each other (for example, an apparatus for capping containers intended to be used in a cosmetics manufacturing company which may be used for capping perfume bottles with a screw cap, perfume bottles with a dosing cap, jars of cream, etc. even with multiple dimensions which are different from each other). Considering the big differences between caps of the various possible typologies, it is impossible to use a unit initially designed to transfer caps of one typology to transfer caps of a different typology without substituting any components. For this reason, the format change-over is necessary and consists of substituting all of those parts of the transferring unit intended to interact with the caps.

In general, the format change-over is quite a laborious and complex operation, since it requires the substitution of mechanical parts of the apparatus. In some cases substitution of a minimal number of components is required, whilst in other cases substitution of many components is required (such as, for example elements of the movement devices, seats which receive components, control systems, sensors, etc.). Considering the laboriousness of this operation, a predetermined time is usually required in order to perform the format change-over, during which the apparatus remains stopped and not operating. That has a negative impact on the productivity of the apparatus which comprises the transferring unit, since the more time is necessary for the format change-over, the greater the loss of production caused by it is. Moreover, the more often it is necessary to switch from one format to another, the more disadvantageous an apparatus becomes if its format change-over takes a long time.

In this context the technical purpose which forms the basis of this invention is to make a transferring unit for transferring caps and an apparatus for capping containers comprising that unit, which at least partly overcome the above-mentioned disadvantages.

In particular, the technical purpose of this invention is to make a transferring unit for transferring caps and an apparatus for capping containers comprising that unit which allow format change-over operations to be performed in a simple and fast way and which therefore guarantee higher productivity than the prior art solutions.

The technical purpose specified and the aims indicated are substantially achieved by a transferring unit for transferring caps and by an apparatus for capping containers comprising that unit as described in the appended independent claims.

Particular embodiments of this invention are defined in the corresponding dependent claims.

Further features and the advantages of this invention will be more apparent in the detailed description of several preferred, non-limiting embodiments of a transferring unit for transferring caps and of an apparatus for capping containers comprising that unit illustrated in the accompanying drawings, in which.

Figure 1:
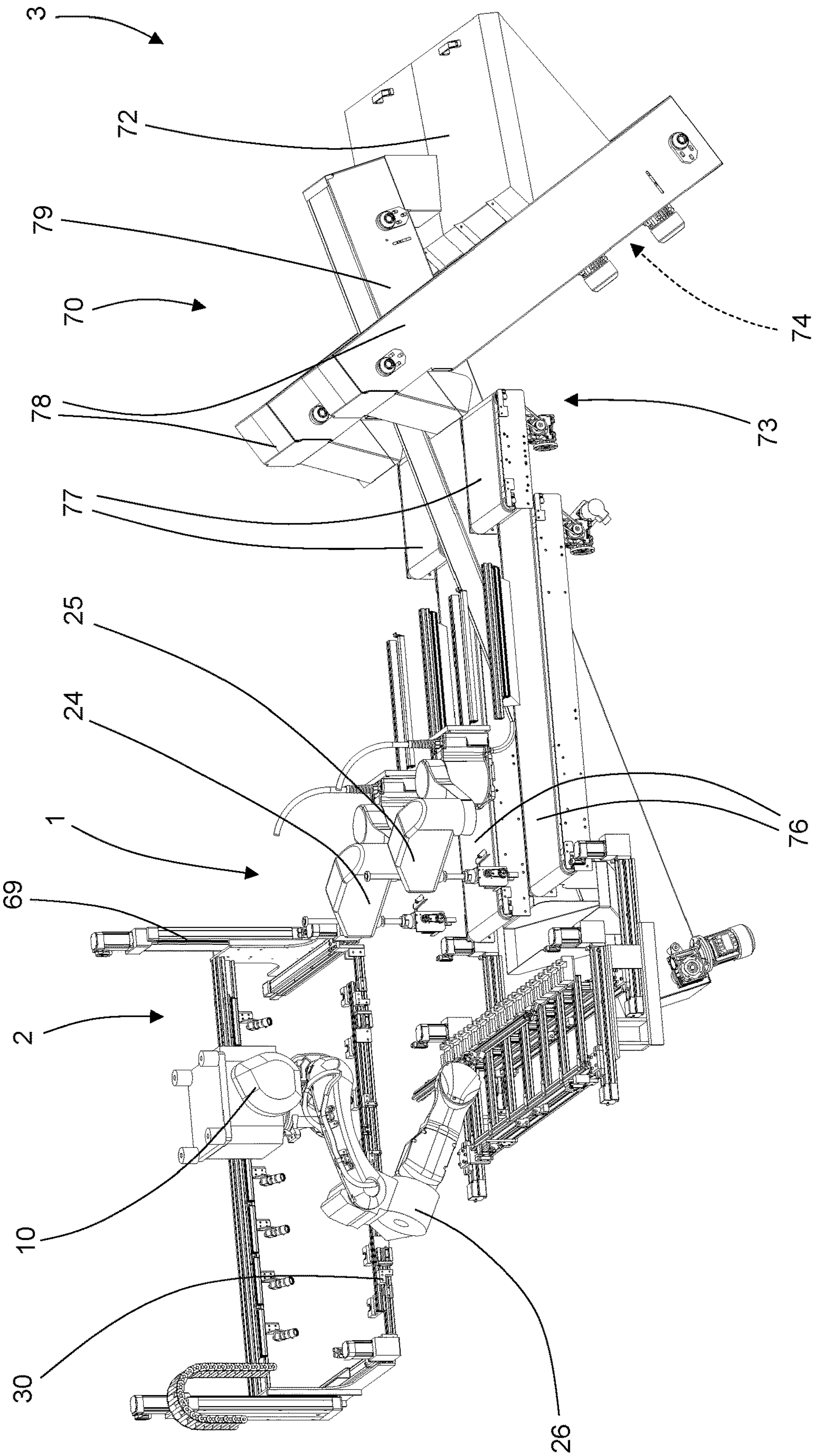
FIG. 1 shows, in an axonometric view, with some parts cut away to better illustrate others, an apparatus for capping containers made in accordance with this invention, without caps.

It should be noticed that the detailed description which follows relates to two separate innovative aspects: on one hand the conveying unit for conveying caps from a loading station to a pick-up station which is innovative and advantageous compared with what is present in the prior art, on the other hand a transferring unit for transferring caps from a pick-up station to a receiving station according to this invention. In an apparatus for capping containers, the conveying unit may be applied for feeding to the pick-up station the caps which are transferred to the unloading station by the transferring device according to this invention. Therefore, there may be a synergic effect between the conveying unit and the transferring unit.

However, the conveying unit may also be applied independently of the transferring unit according to this invention, in particular not requiring the presence of the transferring unit in the apparatus in which the conveying unit is mounted. For this reason, the conveying unit is the subject of a separate patent application.

With reference to the accompanying figures the conveying unit in its entirety is labelled with the reference number 1, whilst the transferring unit in its entirety is labelled with the reference number 2.

In general, the conveying unit 1 and the transferring unit 2 may be two separate units which are part of an apparatus 3 that manages caps 82. However those units have been considered jointly in the context of an apparatus 3 for capping containers in which the caps 82, initially having a random position and orientation, are fed with the correct position and orientation to the capping devices 80. In that apparatus 3, the main function of the conveying unit 1 is to receive the randomly positioned and oriented caps 82 and to place them in an orderly arrangement, whilst the main function of the transferring unit 2 is to feed the caps 82, previously correctly positioned and oriented, towards the capping devices 80.

However, the two technical solutions are not dependent on each other since each could be applied in an apparatus 3 regardless of whether or not the other is present.

In light of the independence of the two technical solutions, hereinafter there is a detailed description first of the conveying unit 1, then of the transferring unit 2 and finally of the apparatus 3 as a whole which comprises both. Considering the synergic nature of the two units in the context of the apparatus 3 which comprises both of them, in those embodiments (such as the one illustrated in the accompanying figures) some elements are part of both the conveying unit 1 and the transferring unit 2. However, it should be emphasised that some features of the shared elements which are necessary to implement one of the two innovative units may not be necessary for the other unit.

The preferred embodiment of the apparatus 3 has both the conveying unit 1 and the transferring unit 2. However since, as already indicated, for application of the conveying unit 1 the presence of the transferring unit 2 is not necessary (and vice versa), there is a description first of the apparatus 3 comprising the conveying unit 1 (but not the transferring unit 2) and the apparatus 3 which comprises the transferring unit 2 (but not the conveying unit 1). To illustrate the link between the various processing units of the apparatuses 3 described, there will then be a description of the preferred embodiment of the apparatus 3, highlighting the interfacing elements between the various units: considering the synergy between the units, some elements are part of more than one unit (in other words, the units have shared elements).

Finally, there will be a description of the method for conveying caps 82, which can advantageously be implemented using the conveying unit 1.

The conveying unit 1 for conveying caps 82 from a loading station 4 to a pick-up station 5 according to this invention comprises first a supporting structure 6, a first housing device 7 and a second housing device 8, with the first housing device 7 and the second housing device 8 mounted on the supporting structure 6. The conveying unit 1 also comprises a loading device 9 positioned at the loading station 4 and a transferring device 10 positioned at the pick-up station 5.

Figure 2:
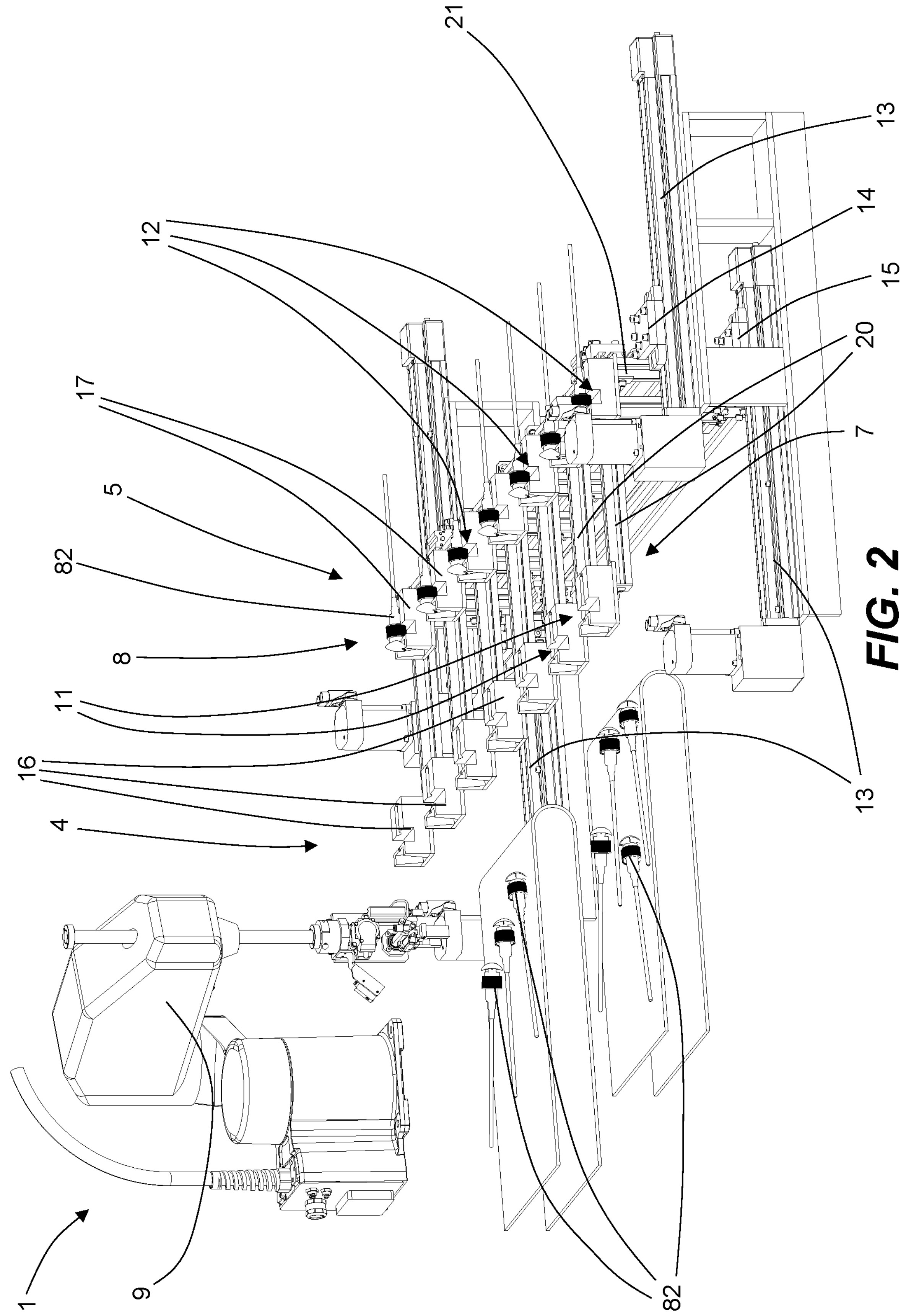
FIG. 2 shows, in an axonometric view, a conveying unit for conveying caps, which is part of the apparatus of FIG. 1 with a first housing device and a second housing device of a first typology in a first configuration, while it moves caps of a first type.

With reference to the first housing device 7, it defines a plurality of first seats 11 each of which is configured to receive a cap 82. Moreover, the first housing device 7 is movable relative to the supporting structure 6 between a first loading position and a first pick-up position. When the first housing device 7 is in the first loading position, the first seats 11 are in the loading station 4 (FIG. 2, in which the first seats 11 are empty). When the first housing device 7 is in the first pick-up position, the first seats 11 are in contrast in the pick-up station 5 (FIG. 3, in which there are caps 82 present in the first seats 11). In use, the shifting of the first housing device 7 from the first loading position to the first pick-up position advantageously occurs after the first seats 11 have been filled with the caps 82 by means of the loading device 9, whilst shifting the opposite way occurs after the first seats 11 have been emptied of the caps 82 by means of the transferring device 10.

Figure 3:
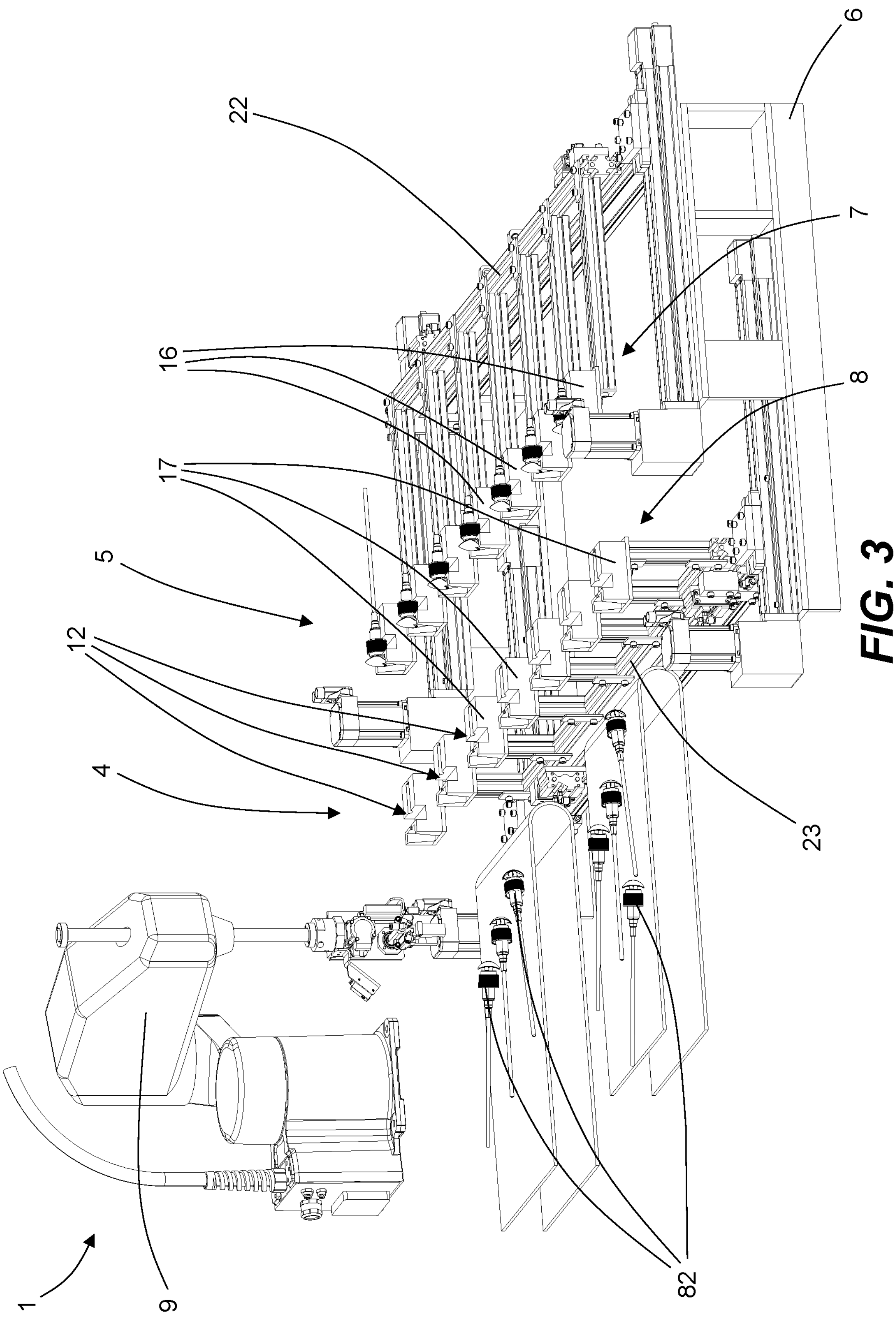
FIG. 3 shows, in an axonometric view, the conveying unit of FIG. 2 with the first housing device and the second housing device in a second configuration.

With reference to the second housing device 8, in contrast it defines a plurality of second seats 12 each of which is configured to receive a cap 82. Moreover, the second housing device 8 is movable relative to the supporting structure 6 between a second loading position and a second pick-up position. When the second housing device 8 is in the second loading position, the second seats 12 are in the loading station 4 (FIG. 3, in which the second seats 12 are empty). When the second housing device 8 is in the second pick-up position, the second seats 12 are in the pick-up station 5 (FIG. 2, in which there are caps 82 present in the second seats 12). In use, the shifting of the second housing device 8 from the second loading position to the second pick-up position advantageously occurs after the second seats 12 have been filled with the caps 82 by means of the loading device 9, whilst shifting the opposite way occurs after the second seats 12 have been emptied of the caps 82 by means of the transferring device 10.

The first housing device 7 defines a first number of first seats 11, the second housing device 8 defines a second number of second seats 12, and in the preferred embodiments the number of the first seats 11 is equal to the number of the second seats 12.

In the embodiment shown in the accompanying figures, the first housing device 7 defines seven first seats 11 and the second housing device 8 defines seven second seats 12.

The loading device 9 is configured to load the caps 82 in the first seats 11 when the first housing device 7 is in the first loading position, or the caps 82 in the second seats 12 when the second housing device 8 is in the second loading position. In contrast, the transferring device 10 is configured to pick up the caps 82 present in the first seats 11, when the first housing device 7 is in the first pick-up position, or the caps 82 present in the second seats 12, when the second housing device 8 is in the second pick-up position. Moreover the transferring device 10 is configured to feed the caps 82 picked up from the first seats 11 or from the second seats 12 to a processing unit which, in the embodiment illustrated in the accompanying figures, is a capping unit 71.

Both the loading device 9 and the transferring device 10 will be described in more detail below.

In accordance with an innovative aspect of the conveying unit, the first housing device 7 and the second housing device 8 are movable relative to each other between a first configuration and a second configuration. When the first housing device 7 and the second housing device 8 are in the first configuration, the first housing device 7 is in the first loading position whilst the second housing device 8 is in the second pick-up position (as shown in FIG. 2). When the first housing device 7 and the second housing device 8 are in the second configuration, the first housing device 7 is in the first pick-up position and the second housing device 8 is in the second loading position (as shown in FIG. 3).

In some embodiments, the movement of the first housing device 7 and the movement of the second housing device 8 are synchronised and simultaneous with each other. In particular, in this case, the first housing device 7 is moved from the first loading position to the first pick-up position when the second housing device 8 is moved from the second pick-up position to the second loading position, and vice versa (that is to say, the second housing device 8 is moved from the second pick-up position to the second loading position when the first housing device 7 is moved from the first loading position to the first pick-up position). Moreover, the first housing device 7 is moved from the first pick-up position to the first loading position when the second housing device 8 is moved from the second loading position to the second pick-up position, and vice versa (that is to say, the second housing device 8 is moved from the second loading position to the second pick-up position when the first housing device 7 is moved from the first pick-up position to the to the first loading position).

However, further embodiments are possible in which the movements of the first housing device 7 and of the second housing device 8 between the respective loading and pick-up positions are not simultaneous with each other.

In particular, in some embodiments, the first housing device 7 is moved from the first pick-up position to the first loading position while the second housing device 8 is in the second loading position, and the second housing device 8 is moved from the second pick-up position to the second loading position while the first housing device 7 is in the first loading position.

Advantageously, in these embodiments the second housing device 8 is moved from the second loading position to the second pick-up position when the first housing device 7 has already returned to the first loading position and the first housing device 7 is moved from the first loading position to the first pick-up position when the second housing device 8 has already returned to the second loading position, in such a way that at the loading station 4 there is always at least one of the two housing devices 7, 8 present with the respective seats 11, 12 not completely filled.

The movement of the first housing device 7 and of the second housing device 8 relative to each other, starting from a condition in which the first housing device 7 is in the first pick-up position and the second housing device 8 is in the second loading position, may be described as follows.

The first housing device 7, from whose first seats 11 the transferring device picked up the caps 82, is moved from the first pick-up position to the first loading position whilst the second housing device 8 is kept in the second loading position. The loading device 9, both during pick-up of the caps 82 present in the first seats 11, and during the movement of the first housing device 7 from the first pick-up position to the first loading position, loads the caps 82 in the second seats 12. After the first loading position has been reached by the first housing device 7, the loading device 9 ends loading of the caps 82 in the second seats 12 having filled them all.

The loading device 9 continues its loading operation, starting to fill the first seats 11 of the first housing device 7 placed in the first loading position, and the second housing device 8, in whose second seats 12 the caps 82 are present, is moved from the second loading position to the second pick-up position. When the second housing device 8 reaches the second pick-up position, the transferring device 10 picks up the caps 82 present in the second seats 12, after which the second housing device 8 is again moved from the second pick-up position to the second loading position. Advantageously, the loading device 9 loads the caps 82 in the first seats 11, during the movement of the second housing device 8 from the second loading position to the second pick-up position, and during pick-up of the caps 82 present in the second seats 12, and during the movement of the second housing device 8 from the second pick-up position to the second loading position; in fact during all of this time the first housing device 7 is in fact kept in the first loading position. After the second loading position has been reached by the second housing device 8, the loading device 9 ends loading of the caps 82 in the first seats 11. At that point everything continues similarly to what was described above, the only difference being that what was previously carried out for one housing device 7, 8 is now performed for the other.

The movement of the devices relative to each other is then cyclically repeated in this way for the whole operation of the conveying unit 1.

Such embodiments with non-simultaneous movement may advantageously be applied if the time taken by the loading device 9 to load the caps 82 in the seats 11, 12 placed in the loading station 4, is greater than the time taken by the transferring device 10 to pick up the caps 82 in the seats 11, 12 placed in the pick-up station 5.

Preferably, the first housing device 7 and the second housing device 8 are movable, respectively between the first loading position and the first pick-up position and between the second loading position and the second pick-up position, with a translating motion along a line of movement.

In the preferred embodiments, the first housing device 7 and the second housing device 8 are movable, relative to the supporting structure 6 and relative to each other, by sliding along guides 13 which are part of the supporting structure 6. In particular, the first housing device 7 comprises at least one first sliding component 14 and the second housing device 8 comprises at least one second sliding component 15, which are slidably mounted on the guides 13 (FIGS. 2 and 3). In particular, the first housing device 7 comprises a pair of first sliding components 14, whilst the second housing device 8 comprises a pair of second sliding components 15.

Preferably, the first housing device 7 comprises a plurality of first housing bodies 16 and the second housing device 8 comprises a plurality of second housing bodies 17. Each of the first housing bodies 16 defines a respective first seat 11, whilst each of the second housing bodies 17 defines a respective second seat 12. Advantageously, the number of first housing bodies 16 is equal to the number of first seats 11, and the number of second housing bodies 17 is equal to the number of second seats 12. In the preferred embodiments, in which the number of first seats 11 is equal to the number of second seats 12, the number of first housing bodies 16 is equal to the number of second housing bodies 17. In particular, in the embodiment shown in the accompanying figures, the first housing device 7 comprises seven first housing bodies 16 and the second housing device 8 comprises seven second housing bodies 17.

However, alternative embodiments, not illustrated, are possible in which for example the first housing device 7 comprises a single first housing body 16 which defines all of the first seats 11 and in which the second housing device 8 comprises a single second housing body 17 which defines all of the second seats 12.

Advantageously, the first housing bodies 16 are side by side along a first side by side arrangement line which is straight and the second housing bodies 17 are side by side along a second side by side arrangement line which is also straight. The first side by side arrangement line and the second side by side arrangement line are preferably parallel to each other. In the embodiments in which the first housing device 7 and the second housing device 8 are movable along the line of movement, the line of movement itself is perpendicular both to the first side by side arrangement line and to the second side by side arrangement line.

In these embodiments, the first housing bodies 16 and the second housing bodies 17 are positioned alternating with each other along a reference line which is parallel both to the first side by side arrangement line and to the second side by side arrangement line. The expression "alternating with each other" means that projecting both the first housing bodies 16, and the second housing bodies 17 on that reference line, between one first housing body 16 and the next there is a second housing body 17 present, just as between one second housing body 17 and the next there is a first housing body 16 present. That feature is clearly visible in FIG. 1, in which the first housing device 7 and the second housing device 8 are both in the respective pick-up positions and the first side by side arrangement line, the second side by side arrangement line and the reference line coincide.

Advantageously, the line of movement is positioned horizontally. Moreover, the first side by side arrangement line and the second side by side arrangement line are advantageously also positioned horizontally.

According to a further innovative aspect of the conveying unit, each first housing body 16 is fixed to a first structural element 20, which is part of the first housing device 7, whilst each second housing body 17 is fixed to a second structural element 21, which is part of the second housing device 8. The first structural element 20 extends mainly along a line of extension positioned horizontally, whilst the second structural element 21 extends mainly along a second line of extension positioned vertically.

Advantageously, the first structural elements 20 are fixed to a first supporting body 22 (for example, a horizontal crosspiece) which is advantageously fixed to the first sliding components 14. Similarly, the second structural elements 21 are preferably fixed to a second supporting body 23 (for example, a horizontal crosspiece) which is advantageously fixed to the second sliding components 15.

The loading device 9 is configured both to load the caps 82 in the first seats 11 when the first housing device 7 is in the first loading position, and to load the caps 82 in the second seats 12 when the second housing device 8 is in the second loading position.

In the preferred embodiments, the loading device 9 comprises at least one robot of the pick and place typology 24, 25. In other embodiments, the loading device 9 comprises at least one robot of another typology other than the pick and place typology.

Advantageously, the loading device 9 comprises a plurality of robots which operate in parallel. In particular, in the embodiment illustrated the loading device 9 comprises a pair of robots of the pick and place typology 24, 25, which are respectively a first pick and place robot 24 and a second pick and place robot 25. However, embodiments are possible in which the loading device 9 comprises a plurality of another typology other than the pick and place typology.

It should be emphasised that a robot of the pick and place typology is a robot which is configured to pick up an object (in this case, a cap 82) from a first position and to position it in a second position. In particular, robots of the pick and place typology 24, 25 are preferably configured to pick up the caps 82 one by one from a conveyor belt 76 and to position them in the seats 11, 12 placed in the loading station 4. The robots of the pick and place typology 24, are also advantageously configured to rotate in space the caps 82 picked up and to position them in the seats 11, 12 with a predetermined orientation.

In particular, in the known way, they are configured to rotate the caps 82 according to any orientation.

Figure 4:
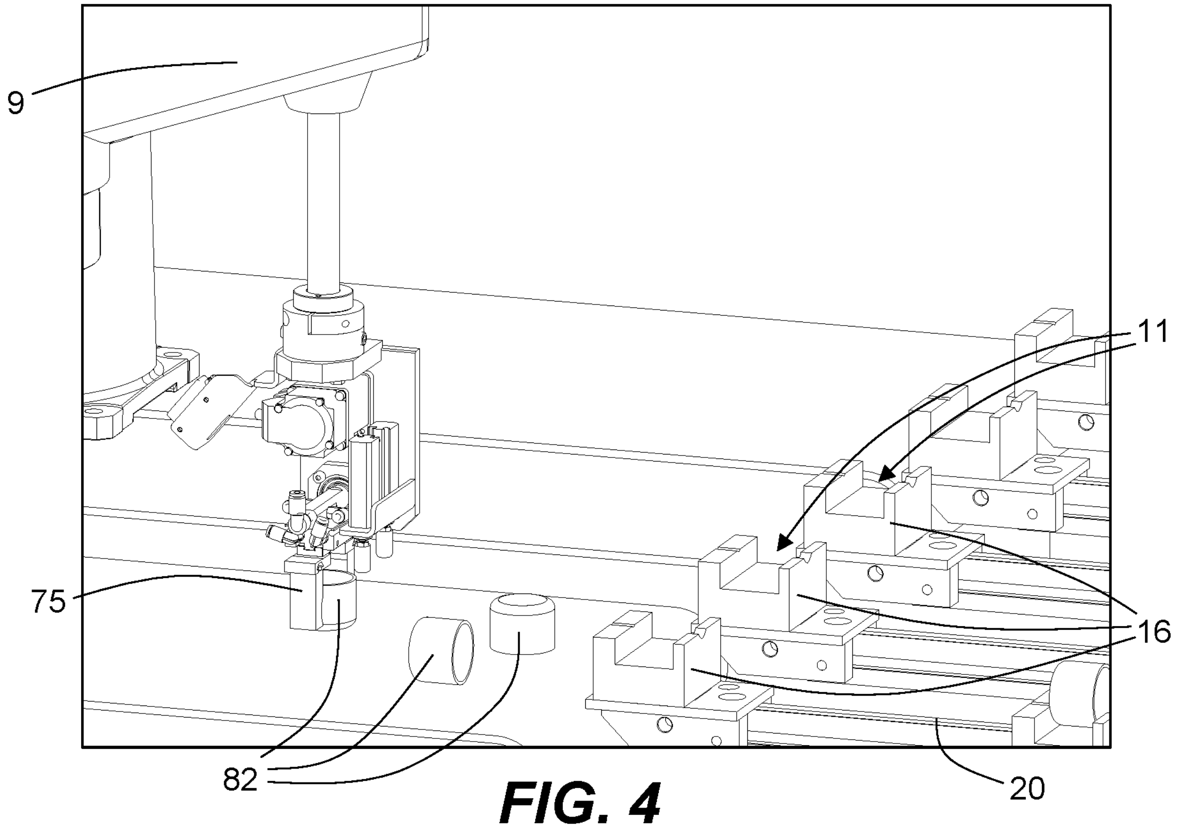
FIGS. 4 and 5 show, in axonometric views from different viewpoints, a loading device, which is part of the apparatus of FIG. 1, while it moves caps of a second type and with a first housing device and a second housing device of a second typology.
Figure 5:
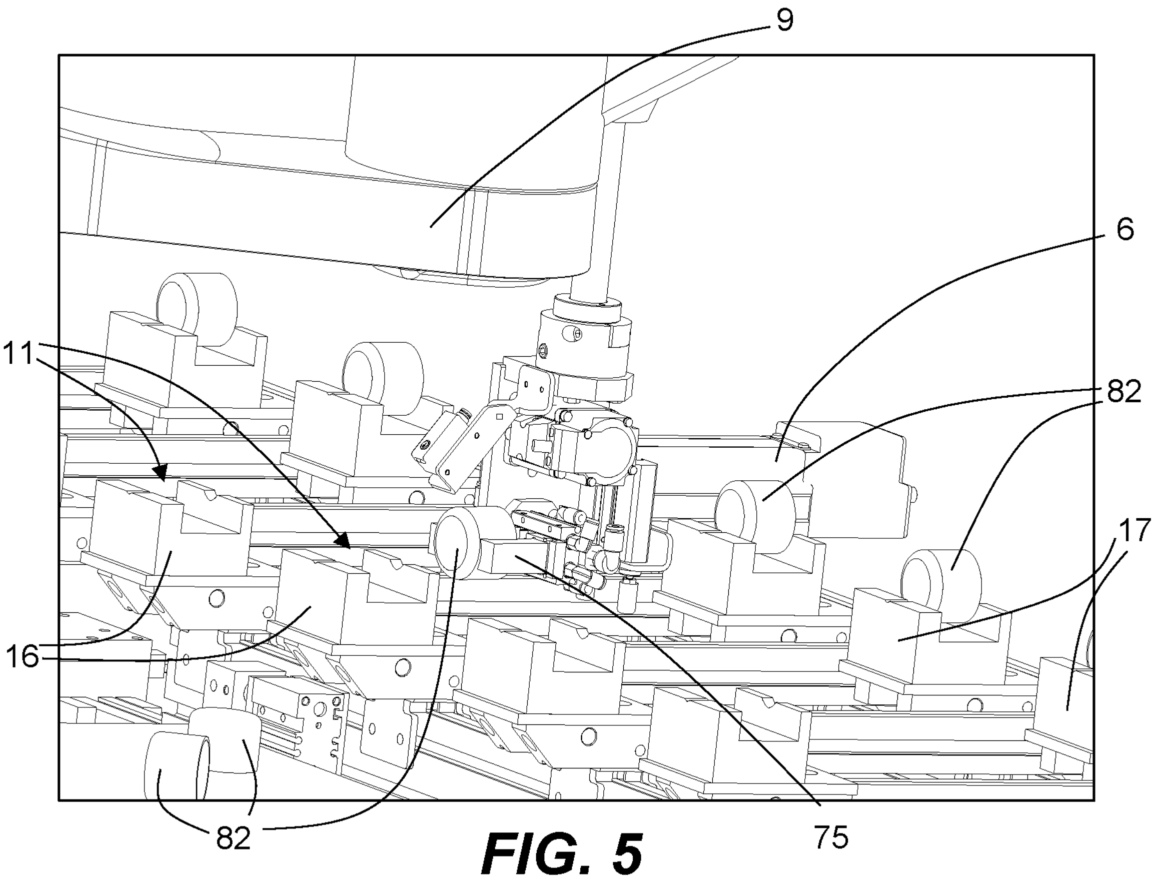

As is clearly visible in the figures, the caps 82 may be randomly positioned on the conveyor belt 76 and the robot of the pick and place typology 24, 25 picks up the cap 82 in the position in which it is placed on the conveyor belt 76 and changes its orientation (FIG. 5), if necessary, to allow correct insertion of the cap 82 into the respective seat 11, 12. For example, it should be noticed that between the pick up of the cap 82 (FIG. 4) and the movement of the robot of the pick and place typology 24, 25 towards the respective seat 11, 12 (FIG. 5), the cap 82 has been rotated 90° relative to an axis perpendicular to the central axis of the cap 82 itself.

Advantageously, the loading device 9 comprises a movable gripping head 75 which is configured to pick up a cap 82 with a random orientation from a conveying system 73, advantageously from the conveyor belt 76, and to position it, with a predefined orientation, in a first seat 11 or in a second seat 12. Preferably, the movable gripping head 75 is part of the robot of the pick and place typology 24, 25.

It should be emphasised that the structure and general operation of a robot of the pick and place typology are in any case well known to a person who is expert in the sector and therefore they are not described in detail herein.

The transferring device 10 is configured both to pick up the caps 82 present in the first seats 11, when the first housing device 7 is in the first pick-up position, and to pick up the caps 82 present in the second seats 12, when the second housing device 8 is in the second pick-up position, as well as to feed the caps 82 picked up to the downstream processing unit.

Preferably, the transferring device 10 comprises an anthropomorphic robot 26 or a robot of another typology. Advantageously, as shown in the accompanying figures, the transferring device 10 also comprises a plurality of gripping units 27 each of which is configured to retain a respective cap 82. In these embodiments, the transferring device 10 is configured to pick up from the seats 11, 12 all of the caps 82 simultaneously and, advantageously, the number of gripping units 27 is equal to the number of first seats 11 and second seats 12. In the embodiment illustrated, the transferring device 10 comprises seven gripping units 27.

Preferably, the transferring device 10 is configured to perform a rotation of the caps 82 between the pick up of the caps 82 from the respective seats 11, 12 and the feeding of the caps 82 to the subsequent processing unit in such a way as to correctly orient the caps 82 for the subsequent step such as, for example, container capping.

Figure 8:
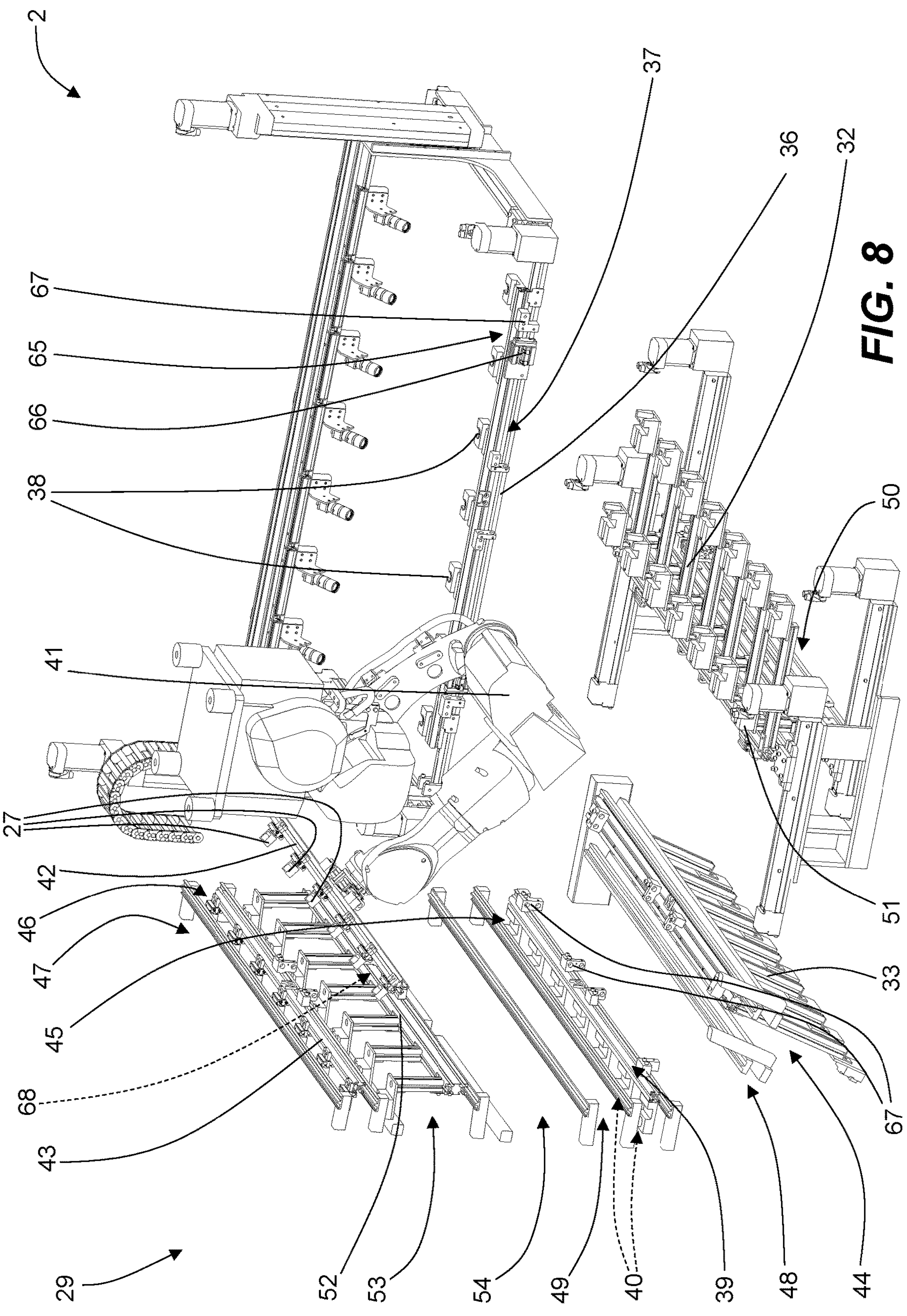
FIG. 8 shows, in an axonometric view, a transferring unit, which is part of the apparatus of FIG. 1 and also shows a magazine which is part of it.

Moving on to the description of the transferring unit 2 for transferring caps 82 from the pick-up station 5 to an unloading station 28 according to this invention, its embodiment which is part of the apparatus 3 described is shown in detail in FIG. 8.

In general terms the transferring unit 2 comprises a supporting structure 6, a magazine 29, which is mounted on the supporting structure 6 and which defines a plurality of housings, a housing device 7, 8, a movement device 30 and a transferring device 10, which are mounted on the supporting structure 6.

In the embodiment illustrated, the supporting structure 6 coincides with that of the conveying unit 1 (and, more generally, with a supporting frame 69 of the apparatus 3), the transferring device 10 with that of the conveying unit 1, and the housing device 7, 8 with each of those of the conveying unit 1. However, even if the conveying unit 1 previously described were to comprise two housing devices 7, 8, that is not necessary for the more general embodiments of the transferring unit 2. In fact, for this the presence of at least one housing device 7, 8 is necessary, which will therefore be referred to below generically with the expression "housing device 7, 8". Moreover, for this invention it is not even necessary for the housing device 7, 8 to be movable relative to the supporting structure 6: in the preferred embodiments, the housing device 7, 8 is movable relative to the supporting structure 6, but in other embodiments the housing device 7, 8 may be stationary relative to the supporting structure 6.

It should be emphasised that, for a clearer description, the features of the housing device 7, 8, which are necessary for the transferring unit 2 according to the innovative aspect of this invention, will be referred to in the following description even if they have already be introduced previously for the conveying unit 1.

Figure 9:
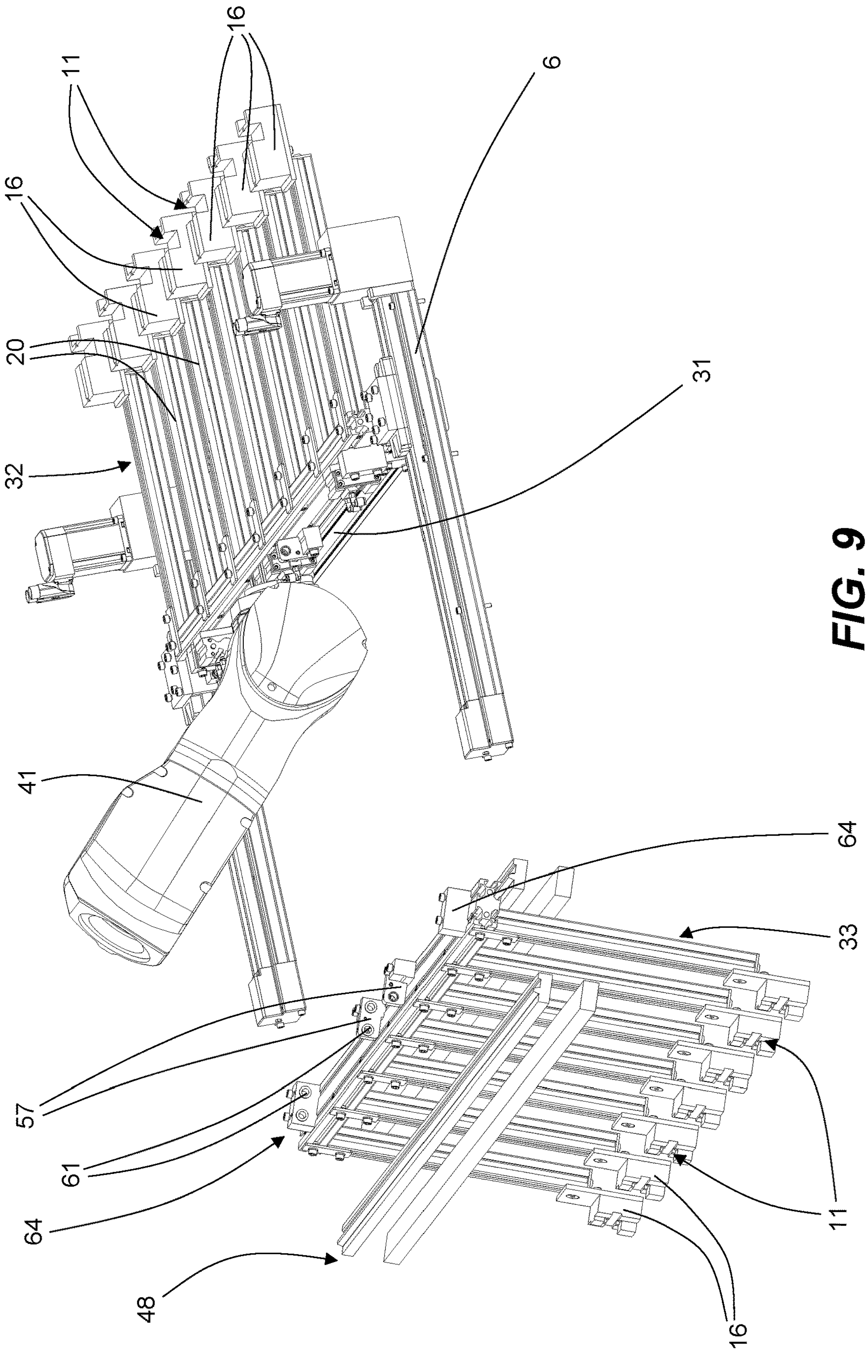
FIG. 9 shows, in an axonometric view, a movable arm of a transferring device, which is part of the apparatus of FIG. 1, in a first removing position.
Figure 10:
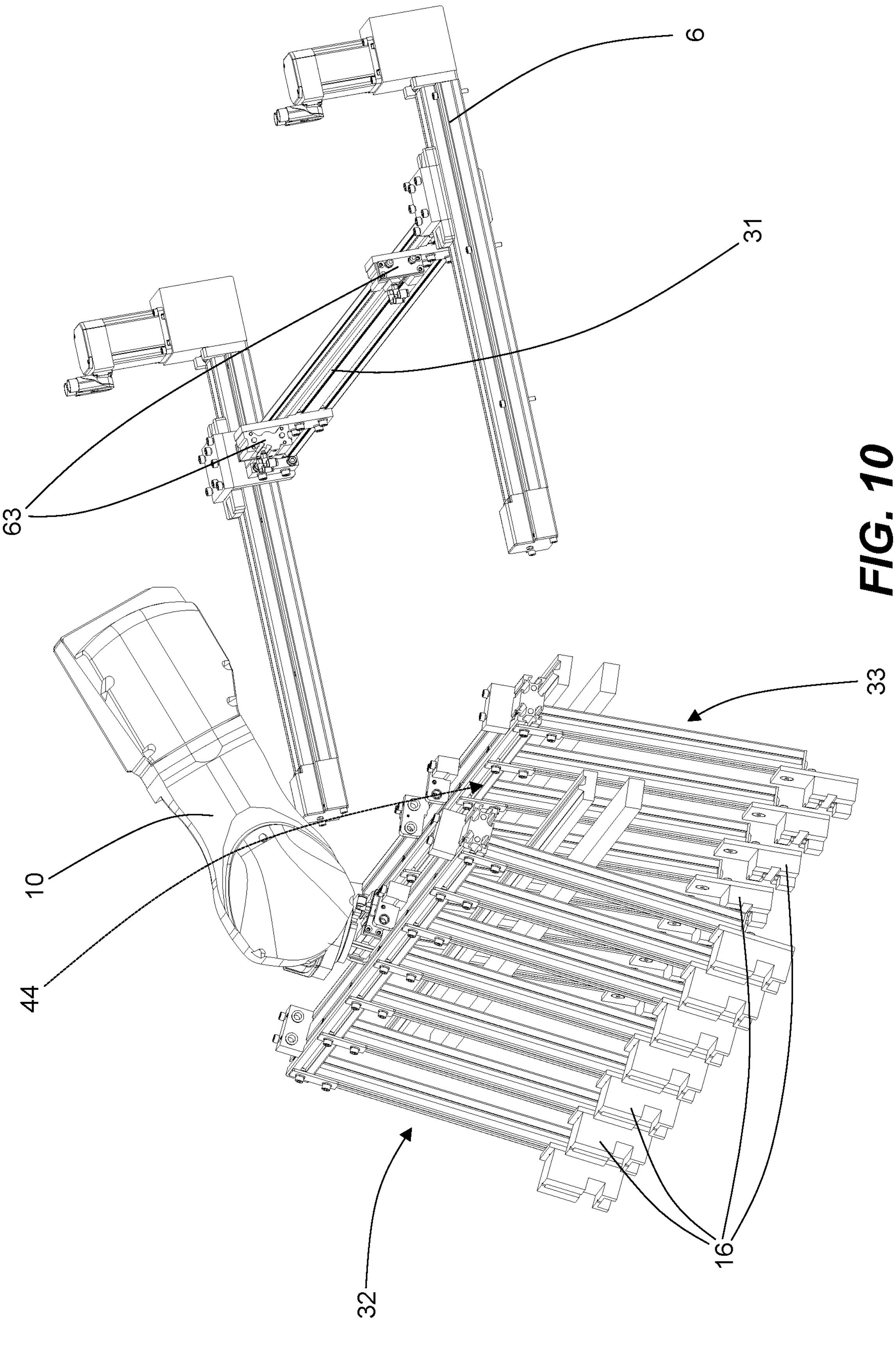
FIG. 10 shows, in an axonometric view, the movable arm of FIG. 9 in a second storage position.
Figure 11:
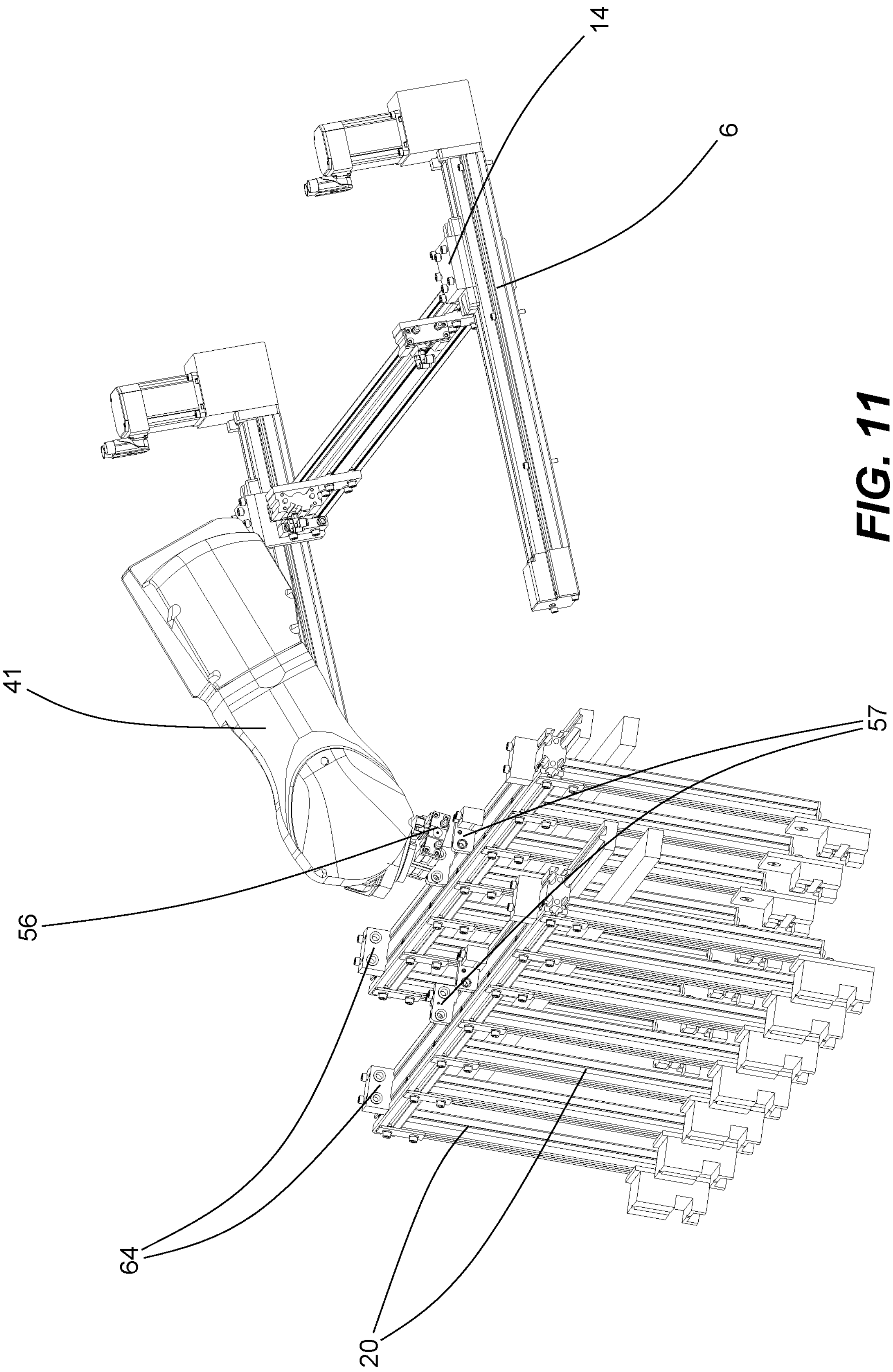
FIG. 11 shows, in an axonometric view, the movable arm of FIG. 10 in a first pick-up position.
Figure 12:
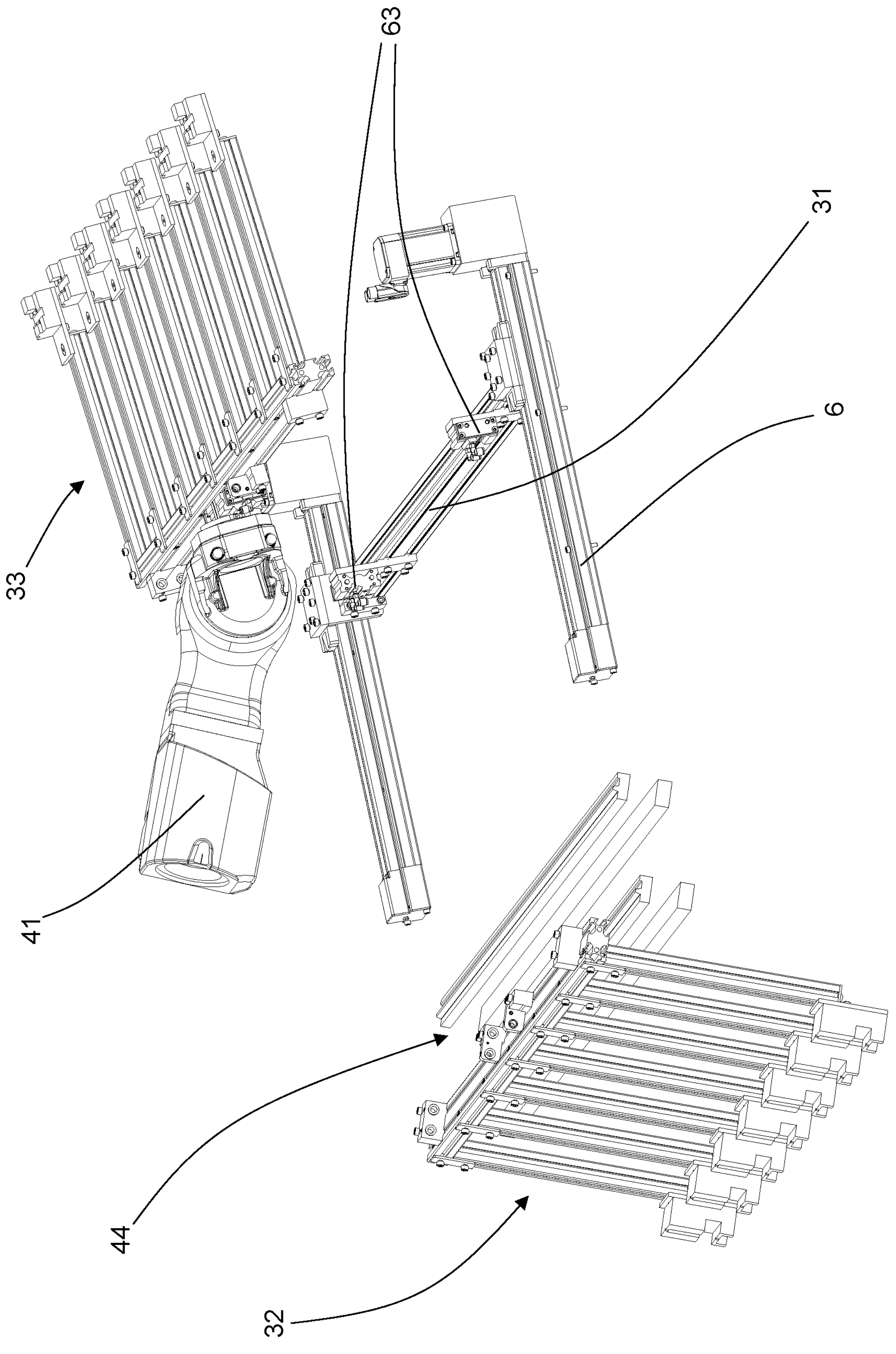
FIG. 12 shows, in an axonometric view, the movable arm of FIG. 11 in an intermediate position between the second storage position and a first mounting position.
Figure 13:
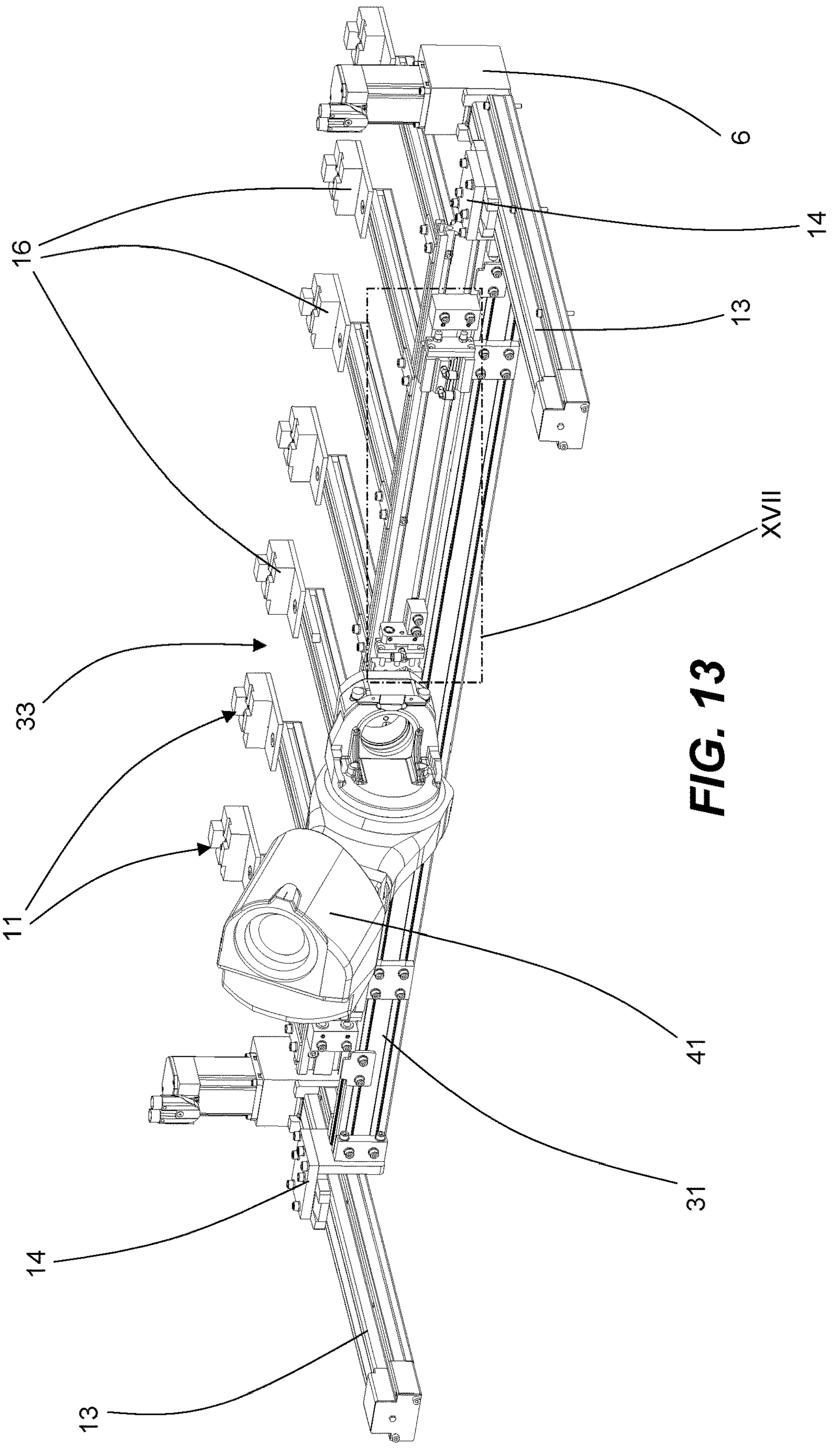
FIG. 13 shows, in an axonometric view, the movable arm of FIG. 12 in a first mounting position with a first active component, which is part of a first hooking system, mounted on the movable arm, in a first active configuration and with a second active component, which is part of a second hooking system, mounted on a first supporting element, in a second inactive configuration.
Figure 14:
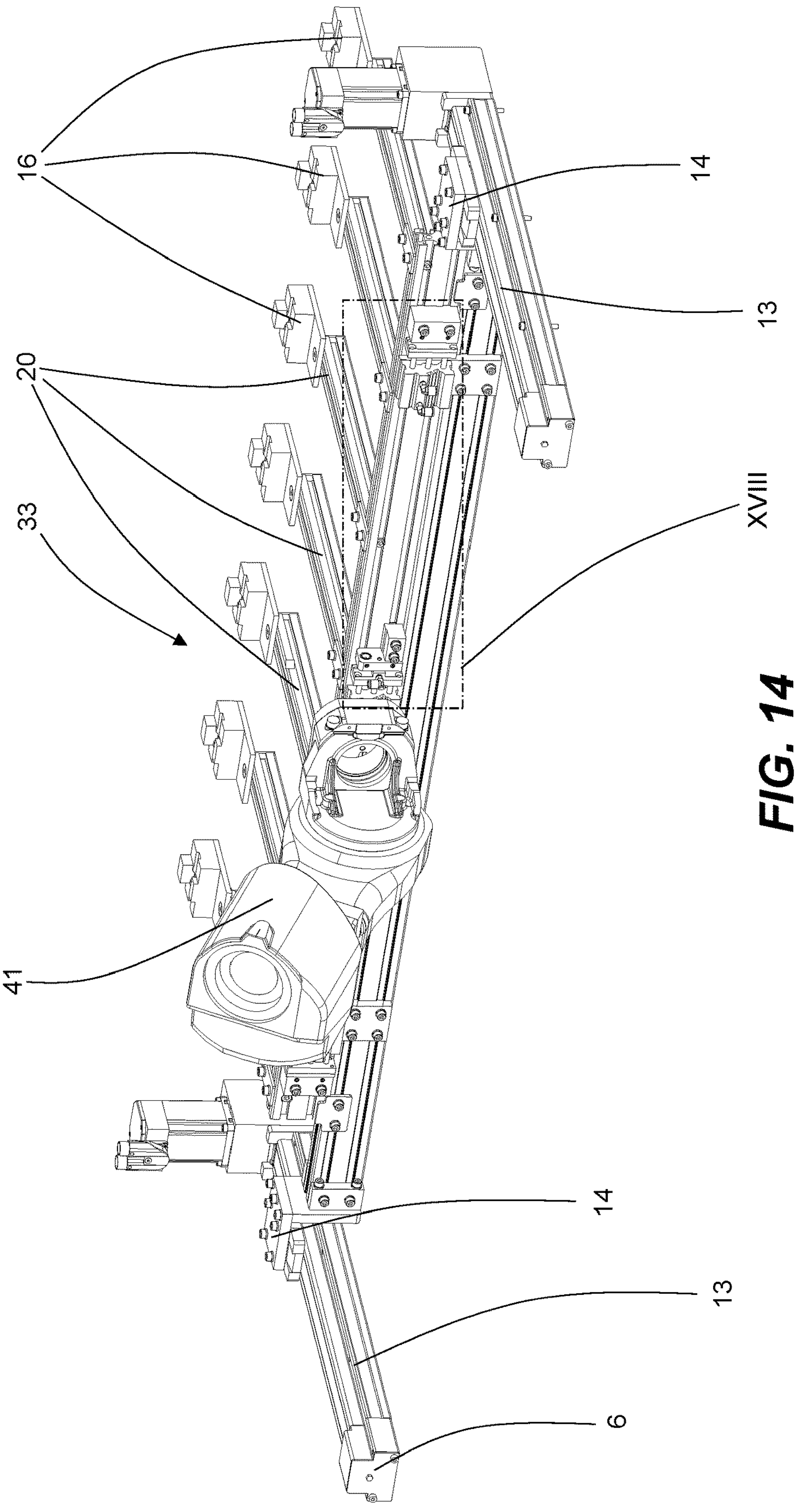
FIG. 14 shows, in an axonometric view, the movable arm of FIG. 13 with the first active component in the first active configuration and with the second active component in a second active configuration.
Figure 15:
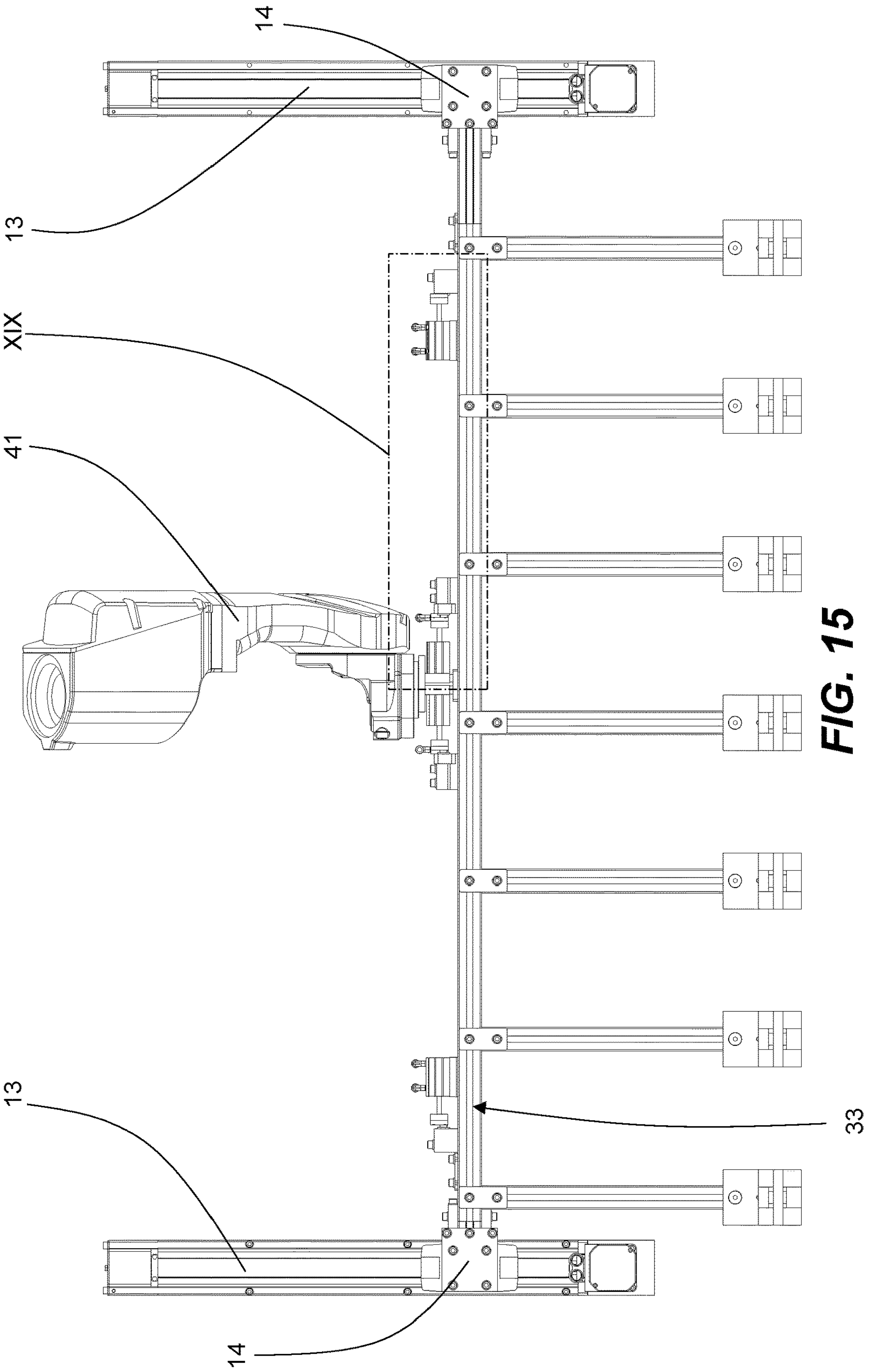
FIG. 15 shows, in a top view, the movable arm of FIG. 14.
Figure 16:
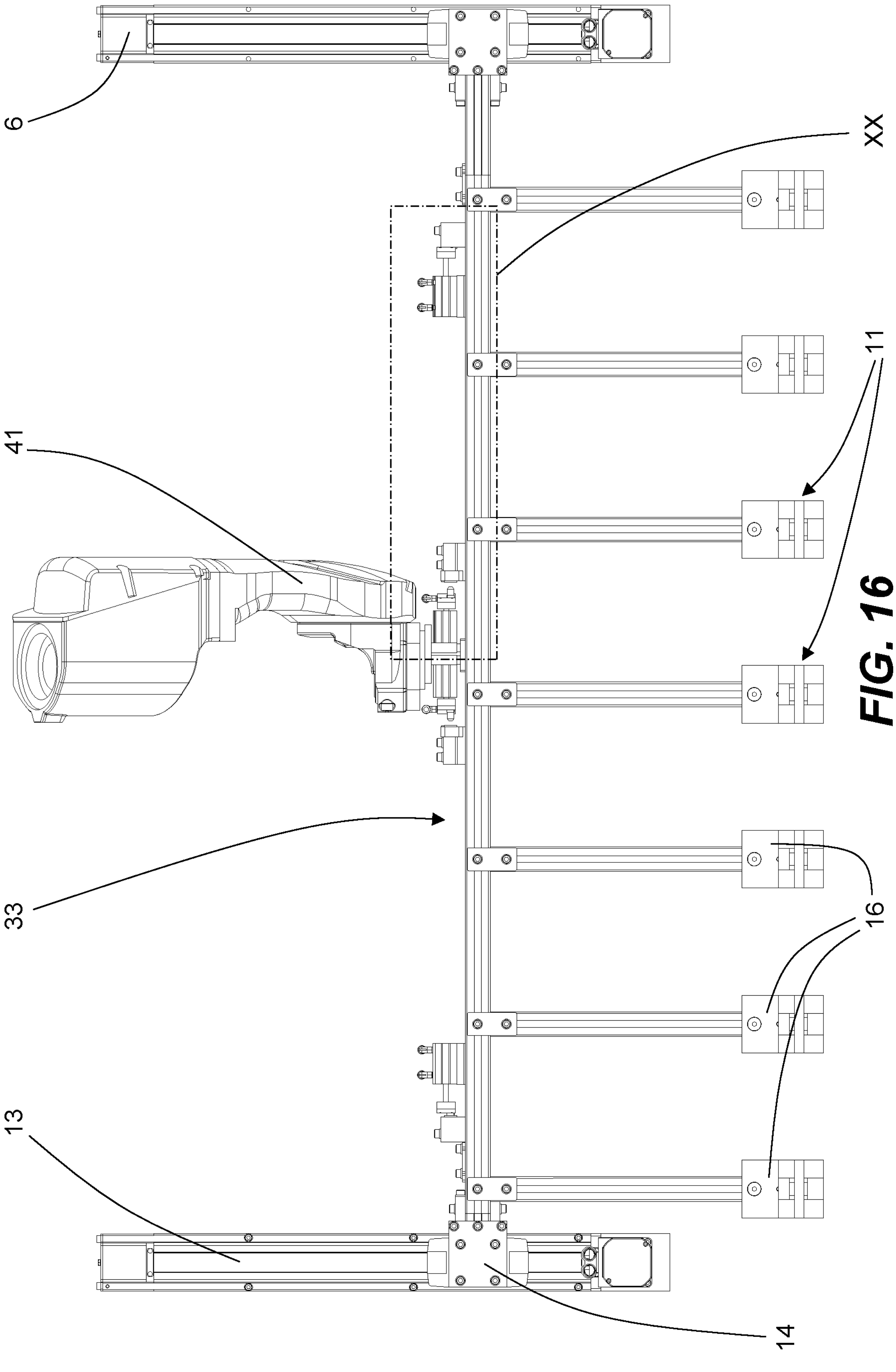
FIG. 16 shows, in a top view, the movable arm of FIG. 15 with the first active component in a first inactive configuration and with the second active component in the second active configuration.

The housing device 7, 8 is mounted on the supporting structure 6 and comprises a first supporting element 31, which is advantageously movable relative to the supporting structure 6, a first receiving element of a first typology 32, which defines a first plurality of seats 11, 12, and a first receiving element of a second typology 33, which defines a second plurality of seats 11, 12. Each of the seats 11, 12 defined by the first receiving element of the first typology 32 (first plurality of seats 11, 12) is configured to receive a cap 82 of a first type, whilst each of the seats 11, 12 defined by the first receiving element of the second typology 33 (second plurality of seats 11, 12) is configured to receive a cap 82 of a second type. For example, a cap 82 of the first type may be a cap 82 with doser, whilst a cap 82 of the second type may be a screw cap 82; in the case illustrated for example in FIGS. 9 to 11, in contrast, the caps 82 of both of the typologies are caps 82 with doser but having different dimensions.

Although hereinafter reference is made only to two different typologies of first receiving elements 32, 33 and of caps 82, what is described may also be applied, with the appropriate adjustments, if there are further typologies of first receiving elements and of caps 82 present; in fact, in more complex embodiments, the transferring unit 2 may comprisethree or more first receiving elements each of a different typology.

The first receiving element of the first typology 32 and the first receiving element of the second typology 33 are alternatively removably mountable, on the first supporting element 31 and are interchangeable.

The movement device 30, is mounted on the supporting structure 6 at the unloading station 28. The movement device 30 comprises a second supporting element 36, movable relative to the supporting structure 6, a second receiving element of a first typology 37, which defines a first plurality of housing compartments 38, and a second receiving element of a second typology 39, which defines a second plurality of housing compartments 40. Each of the housing compartments 38 defined by the second receiving element of the first typology 37 (first plurality of housing compartments 38) is configured to receive a cap 82 of the first type, whilst each of the housing compartments 40 defined by the second receiving element of the second typology 39 (second plurality of housing compartments 40) is configured to receive a cap 82 of the second type. Advantageously, the number of housing compartments 38, 40 is equal to the number of seats 11, 12 defined by the housing device 7, 8.

The second receiving element of the first typology 37 and the second receiving element of the second typology 39 are alternatively removably mountable, on the second supporting element 36 and are interchangeable. If the transferring unit 2 comprises three or more first receiving elements each of a different typology, the movement device 30 also comprises the same number of second receiving elements configured for similar types of caps 82. The transferring device 10 is mounted on the supporting structure 6 and operates between the pick-up station 5 and the unloading station 28.

The transferring device 10 comprises a movable arm 41, and at least one gripping element 42, 43, which is configured to retain a plurality of caps 82.

In the preferred embodiments, the transferring device 10 comprises a gripping element of a first typology 42, which is configured to retain a plurality of caps 82 of the first type, and a gripping element of a second typology 43, which is configured to retain a plurality of caps 82 of the second type. The gripping element of the first typology 42 and the gripping element of the second typology 43 are alternatively removably mountable on the movable arm 41 and are interchangeable.

Each gripping element 42, 43 comprises respective gripping units 27 each of which is configured to retain a respective cap 82 of the required type. Advantageously, the number of gripping units 27 is equal to the number of seats 11, 12 defined by the housing device 7, 8 and to the number of housing compartments 38, 40.

If the transferring unit 2 comprises three or more first receiving elements each of a different typology, the transferring device 10 may also advantageously comprise a same number of gripping elements configured to retain the corresponding types of caps 82.

In accordance with an innovative aspect of this invention, the movable arm 41 is also removably couplable both to the first receiving elements 32, 33, and to the second receiving elements 37, 39.

Advantageously, the movable arm 41 comprises an anthropomorphic robot 26 or a robot of another type.

In accordance with a further innovative aspect of this invention, the transferring unit 2 is switchable between a working configuration and a format change-over configuration.

In the working configuration the housing device 7, 8 is in the pick-up station 5, one first receiving element 32, 33 is associated with the first supporting element 31 and the other (or the others if more than one) first receiving element 33, 32 is housed in a respective first housing 44, whilst one second receiving element 37, 39 is associated with the second supporting element 36 and the other (or the others if more than one) second receiving element 39, 37 is housed in another respective second housing 45. Moreover, if there are multiple gripping elements present, one gripping element 42, 43 is associated with the movable arm 41 and the other (or the others if more than one) gripping element 43, 42 is housed in a respective third housing 46. The first receiving element 32, 33 associated with the first supporting element 31, the second receiving element 37, 39 associated with the second supporting element 36 and the gripping element 42, 43 associated with the movable arm 41 are all configured for caps 82 of the same type. For example, if the first receiving element of the first typology 32 is associated with the first supporting element 31, whilst the first receiving element of the second typology 33 is housed in the respective first housing 44, the second receiving element of the first typology 37 is associated with the second supporting element 36, whilst the second receiving element of the second typology 39 is housed in the other respective second housing 45 and the gripping element of the first typology 42 is associated with the movable arm 41, whilst the gripping element of the second typology 43 is housed in the other respective third housing 46.

When the transferring unit 2 is in the working configuration, the transferring device 10 operates a transferring mode, whilst when the transferring unit 2 is in the format change-over configuration, the transferring device 10 operates according to a format change-over mode.

In the transferring mode, the transferring device 10 is moved for picking up the caps 82 from the seats 11, 12 of the first receiving element 32, 33 associated with the first supporting element 31 and for positioning those caps 82 in the housing compartments 38, 40 of the second receiving element 37, 39 associated with the second supporting element 36.

Advantageously, during the transfer, the transferring device 10 changes the spatial orientation of the caps 82 as described above relative to the conveying unit 1.

In the format change-over mode, starting from a working configuration, the movable arm 41 is moved for swapping over the first receiving element 32, 33 associated with the first supporting element 31 and a first receiving element 33, 32 placed in the respective first housing 44, and for swapping over the second receiving element 37, 39 associated with the second supporting element 36 and a second receiving element 39, 37 placed in the respective second housing 45. Moreover, if there are multiple gripping elements present, the movable arm 41 can be moved for swapping over the gripping element 42, 43 associated with the movable arm 41 and a gripping element 43, 42 placed in the respective third housing 46.

Hereinafter, regarding the description of some aspects linked to the format change-over mode, reference will mainly be made to the example referred to above in which the first receiving element 32, 33 associated with the first supporting element 31, the second receiving element 37, 39 associated with the second supporting element 36 and the gripping element 42, 43 associated with the movable arm 41 are all elements of the first typology 32, 37, 42.

In the preferred embodiments, when the transferring device 10 operates according to the format change-over mode, the movable arm 41 moves between a plurality of positions. Advantageously, the movable arm 41 moves between those positions for swapping over respectively the first receiving elements 32, 33, the second receiving elements 37, 39 and, if necessary, the gripping elements 42, 43, as described in detail below.

Those positions are adopted starting from a first storage position, which the movable arm 41 adopts first and in which the movable arm 41 is associated with the magazine 29 for releasing the gripping element 42, 43 associated with the movable arm 41 in a first free housing 47, and ending with a gripping position, which the movable arm 41 adopts last and in which the movable arm 41 is associated with the magazine 29 for coupling to a gripping element 42, 43 (43, 42) and for picking up that gripping element 42, 43 (43, 42) from a respective housing.

The gripping element 42, 43 (43, 42) to which the movable arm 41 couples in the gripping position may be either the same gripping element 42, 43 previously stored in the first free housing 47, or a different gripping element 43, 42 housed in the respective third housing 46. For example, in the first storage position the movable arm 41 is associated with the magazine 29 for releasing the gripping element of the first typology 42 in the first free housing 47, whilst in the gripping position the movable arm 41 is associated with the magazine 29 for coupling to the gripping element of the second typology 43 and for picking it up from the respective third housing 46.

In other words, in the format change-over mode, first of all the movable arm 41 is freed of the gripping element 42, 43 so that it can be used to substitute the other parts, and only once the substitutions are finished, the movable arm is again equipped with a suitable gripping element 42, 43 (43, 42).

Advantageously, for swapping over the first receiving elements 32, 33, the movable arm 41, without the gripping element 42, 43, moves from a first removing position, to a second storage position, to a first pick-up position and to a first mounting position (in this order). In the first removing position, the movable arm 41 is associated with the housing device 7, 8 for coupling to the first receiving element 32, 33 associated with the first supporting element 31 and for removing that first receiving element 32, 33 from the first supporting element 31, whilst in the second storage position, the movable arm 41 is associated with the magazine 29 for releasing the first receiving element 32, 33, removed from the first supporting element 31, in a second free housing 48. In the first pick-up position, the movable arm 41 is associated with the magazine 29 for coupling to the other first receiving element 33, 32 for picking up the other first receiving element 33, 32 from the respective first housing 44, whilst in the first mounting position, the movable arm 41 is associated with the first supporting element 31 for mounting on the first supporting element 31 the other first receiving element 33, 32 picked up from the respective first housing 44.

For example, in the first removing position, the movable arm 41 is associated with the housing device 7, 8 for coupling to the first receiving element of the first typology 32 and for removing it from the first supporting element 31, whilst, in the second storage position, the movable arm 41 is associated with the magazine 29 for releasing the first receiving element of the first typology 32 in the second free housing 48. In the first pick-up position, the movable arm 41 is associated with the magazine 29 for coupling to the first receiving element of the second typology 33 for picking it up from the respective first housing 44, whilst, in the first mounting position, the movable arm 41 is associated with the first supporting element 31 for mounting on it the first receiving element of the second typology 33.

Advantageously and similarly, for swapping over the second receiving elements 37, 39, the movable arm 41 moves from a second removing position, to a third storage position, to a second pick-up position and to a first second mounting position (in this order). In the second removing position, the movable arm 41 is associated with the movement device 30 for coupling to the second receiving element 37, 39 associated with the second supporting element 36 and for removing that second receiving element 37, 39 from the second supporting element 36, whilst in the third storage position, the movable arm 41 is associated with the magazine 29 for releasing the second receiving element 37, 39 removed from the second supporting element 36 in a third free housing 49. In the second pick-up position, the movable arm 41 is associated with the magazine 29 for coupling to the other second receiving element 39, 37 for picking up the other second receiving element 39, 37 from the respective second housing 45, whilst in the second mounting position, the movable arm 41 is associated with the second supporting element 36 for mounting on the second supporting element 36 the other second receiving element 39, 37 picked up from the respective second housing 45.

For example, in the second removing position, the movable arm 41 is associated with the movement device 30 for coupling to the second receiving element of the first typology 37 and for removing it from the second supporting element 36, whilst, in the third storage position, the movable arm 41 is associated with the magazine 29 for releasing the second receiving element of the first typology 37 in the third free housing 49. In the second pick-up position, the movable arm 41 is associated with the magazine 29 for coupling to the second receiving element of the second typology 39 for picking it up from the respective second housing 45, whilst, in the second mounting position, the movable arm 41 is associated with the second supporting element 36 for mounting on it the second receiving element of the second typology 39.

In the preferred embodiments, the transferring unit 2 also comprises a further housing device 8, 7 which is mounted on the supporting structure 6. In these embodiments, as described for the conveying unit 1, the housing device 7, 8 and the further housing device 8, 7 are advantageously movable both relative to the supporting structure 6, and relative to each other. As described with reference to the conveying unit 1, the housing device 7, 8 and the further housing device 8, 7 are movable relative to each other between a first operating configuration and a second operating configuration. In the first operating configuration, the housing device 7, 8 is in the pick-up station 5 and the further housing device 8, 7 is spaced from the pick-up station 5 (and advantageously is located in a loading station 4 in which it receives the caps 82). In the second operating configuration, the further housing device 8, 7 is in the pick-up station 5 and the housing device 7, 8 is spaced from the pick-up station 5 (and advantageously is located in the loading station 4). With reference to the embodiment described and illustrated herein, the housing device 7, 8 and the further housing device 8, 7 of the transferring device 10 coincide with the first housing device 7 and the second housing device 8 of the conveying unit 1. In general, the housing device 7, 8 and the further housing device 8, 7 alternatively feed the caps 82 to the pick-up station 5. Preferably, the further housing device 8, 7 comprises a third supporting element 50, advantageously movable relative to the supporting structure 6, a third receiving element of a first typology 51, which defines a third plurality of seats 12, 11, and a third receiving element of a second typology 52 which defines a fourth plurality of seats 12, 11. Each of the seats 12, 11 defined by the third receiving element of the first typology 51 (third plurality of seats 12, 11) is configured to receive a cap 82 of the first type, whilst each of the seats 12, 11 defined by the third receiving element of the second typology 52 (fourth plurality of seats 12, 11) is configured to receive a cap 82 of the second type. Advantageously, the third receiving element of the first typology 51 and the third receiving element of the second typology 52 are alternatively removably mountable on the third supporting element 50 and are interchangeable. Moreover, the movable arm 41 is also couplable to the third receiving elements 51, 52.

Preferably, in the working configuration of the transferring unit 2, one third receiving element 51, 52 is associated with the third supporting element 50 and the other third receiving element 52, 51 is housed in a respective fourth housing 53, with the third receiving element 51, 52 associated with the third supporting element 50 configured for caps 82 of the same type as the first receiving element 32, 33 associated with the first supporting element 31. For example, the third receiving element of the first typology 51 is associated with the third supporting element 50, whilst the third receiving element of the second typology 52 is housed in the respective fourth housing 53.

Advantageously, when the transferring device 10 operates according to the transferring mode, the transferring device 10 is moved for picking up the caps 82 from the seats 11, 12 of the first receiving element 32, 33 associated with the first supporting element 31, when the housing device 7, 8 and the further housing device 8, 7 are in the first operating configuration, and from the seats 12, 11 of the third receiving element 51, 52 associated with the third supporting element 50, when the housing device 7, 8 and the further housing device 8, 7 are in the second operating configuration. Moreover, the transferring device 10 is moved for positioning the caps 82, picked up from the first receiving element 32, 33 or from the third receiving element 51, 52, in the housing compartments 38, 40 of the second receiving element 37, 39 associated with the second supporting element 36.

In contrast, when the transferring device 10 operates according to the format change-over mode, the movable arm 41 is also moved for swapping over the third receiving element 51, 52 associated with the third supporting element 50 and the third receiving element 52, 51 placed in the respective fourth housing 53.

Advantageously, when the transferring device 10 operates according to the format change-over mode, the movable arm 41 also adopts further positions, after the first storage position and before the gripping position, for swapping over the third receiving elements 51, 52. In fact, the movable arm 41 moves, in order, from a third removing position, to a fourth storage position, to a third pick-up position and to a third mounting position. In the third removing position, the movable arm 41 is associated with the further housing device 8, 7 for coupling to the third receiving element 51, 52 associated with the third supporting element 50 and for removing that third receiving element 51, 52 from the third supporting element 50, whilst in the fourth storage position, the movable arm 41 is associated with the magazine 29 for releasing, in a fourth free housing 54, the third receiving element 51, 52 removed from the third supporting element 50. In the third pick-up position, the movable arm 41 is associated with the magazine 29 for coupling to the other third receiving element 52, 51 for picking up the other third receiving element 52, 51 from the respective fourth housing 53, whilst in the third mounting position, the movable arm 41 is associated with the third supporting element 50 for mounting on the third supporting element 50 the other third receiving element 52, 51 picked up from the respective fourth housing 53.

For example, in the third removing position, the movable arm 41 is associated with the further housing device 8, 7 for coupling to the third receiving element of the first typology 51 and for removing it from the third supporting element 50, whilst, in the fourth storage position, the movable arm 41 is associated with the magazine 29 for releasing, in the fourth free housing 54, the third receiving element of the first typology 32. In the third pick-up position, the movable arm 41 is associated with the magazine 29 for coupling to the third receiving element of the second typology 52 for picking it up from the respective fourth housing 53, whilst in the third mounting position, the movable arm 41 is associated with the third supporting element 50 for mounting on it the third receiving element of the second typology 52.

In the preferred embodiments, the transferring unit 2 also comprises a first hooking system 55 comprising a first active component 56, mounted on the movable arm 41, and a plurality of first passive components 57. One of the first passive components 57 is mounted on each receiving element (first receiving elements 32, 33 and second receiving elements 37, 39 and, advantageously, third receiving elements 51, 52) and on each gripping element 42, 43.

Advantageously, the first active component 56 is switchable between a first inactive configuration and a first active configuration. In the first inactive configuration, the first active component 56 can be associated with (and disassociated from) each first passive component 57. In the first active configuration, if the first active component 56 is associated with a first passive component 57, the same first active component 56 is fixed to that first passive component 57 for rendering the respective element (on which the first passive component 57 is mounted) integral with the movable arm 41.

In other words, the switching between the first active configuration and the first inactive configuration, and vice versa, allows the movable arm 41 to couple to, and to uncouple from, respective receiving elements and gripping elements.

Figure 17:
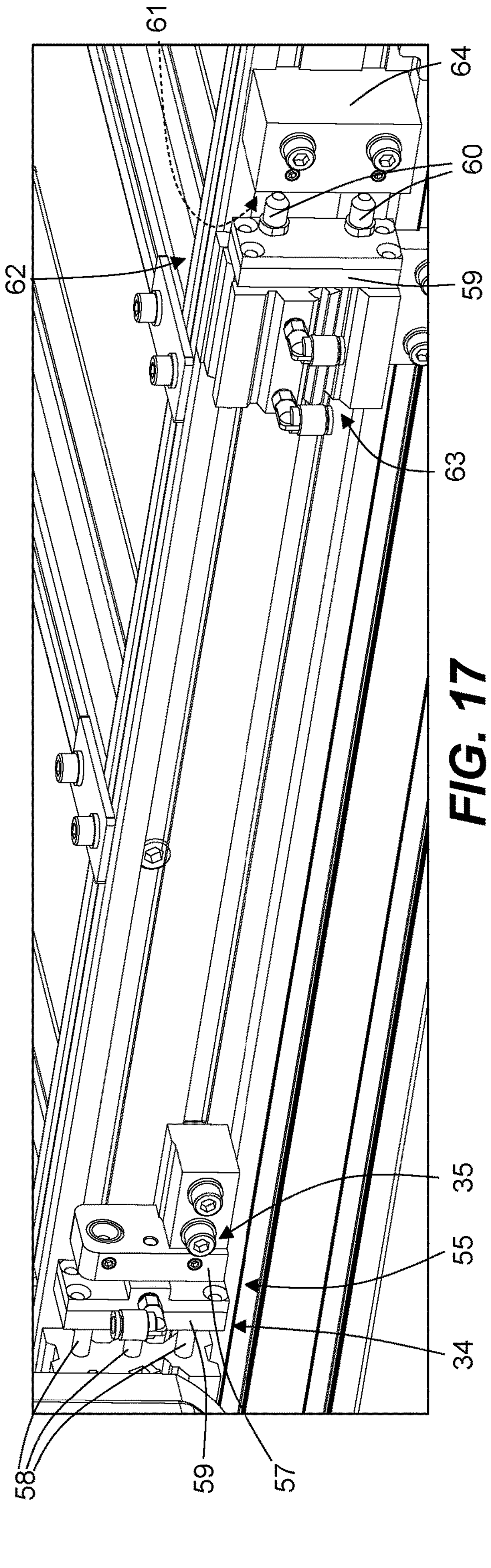
FIGS. 17 and 18 show respectively, enlarged, the detail XVII of FIG. 13 and the detail XVIII of FIG. 14.
Figure 18:
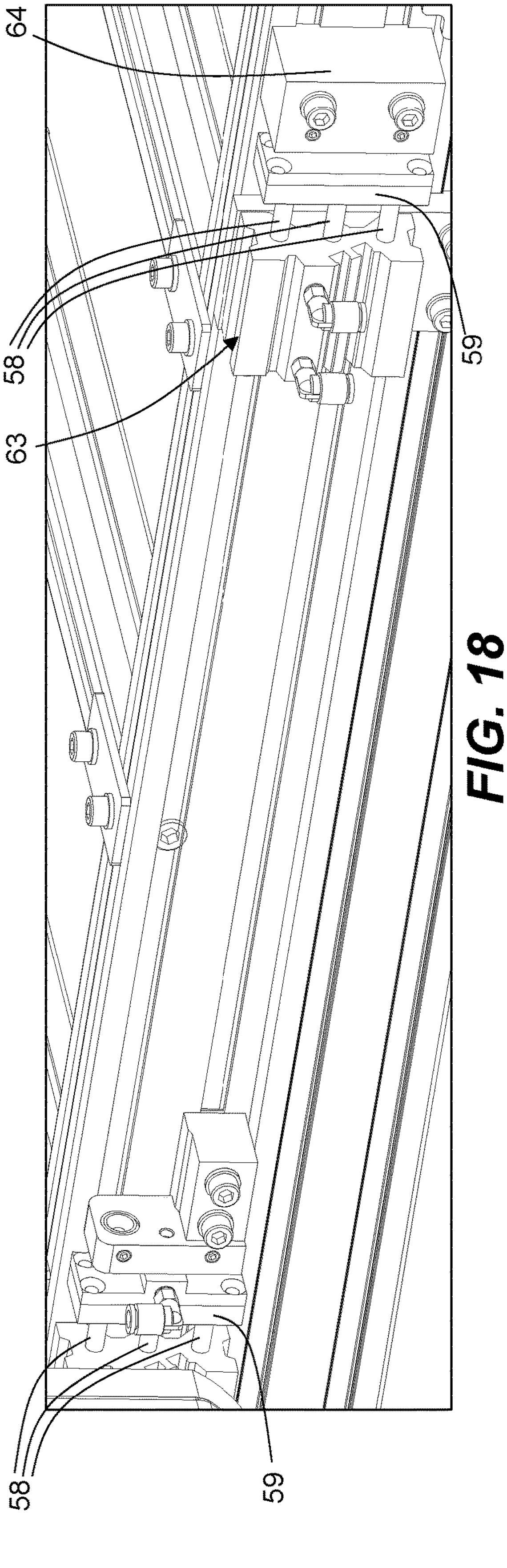
Figure 19:
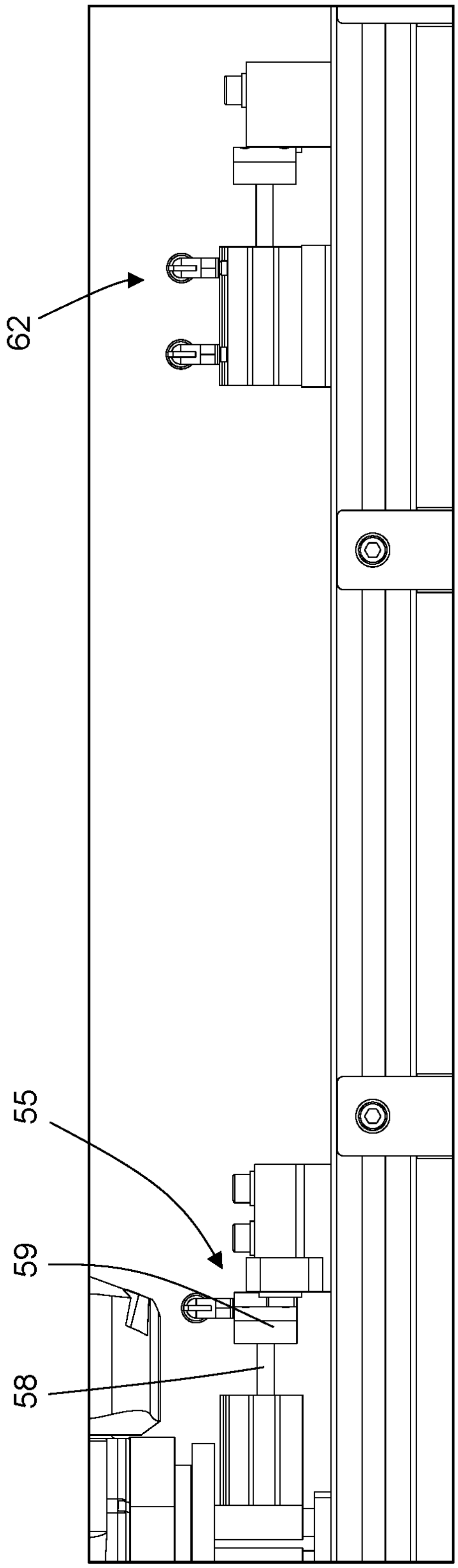
FIGS. 19 and 20 show respectively, enlarged, the detail XIX of FIG. 15 and the detail XX of FIG. 16.
Figure 20:
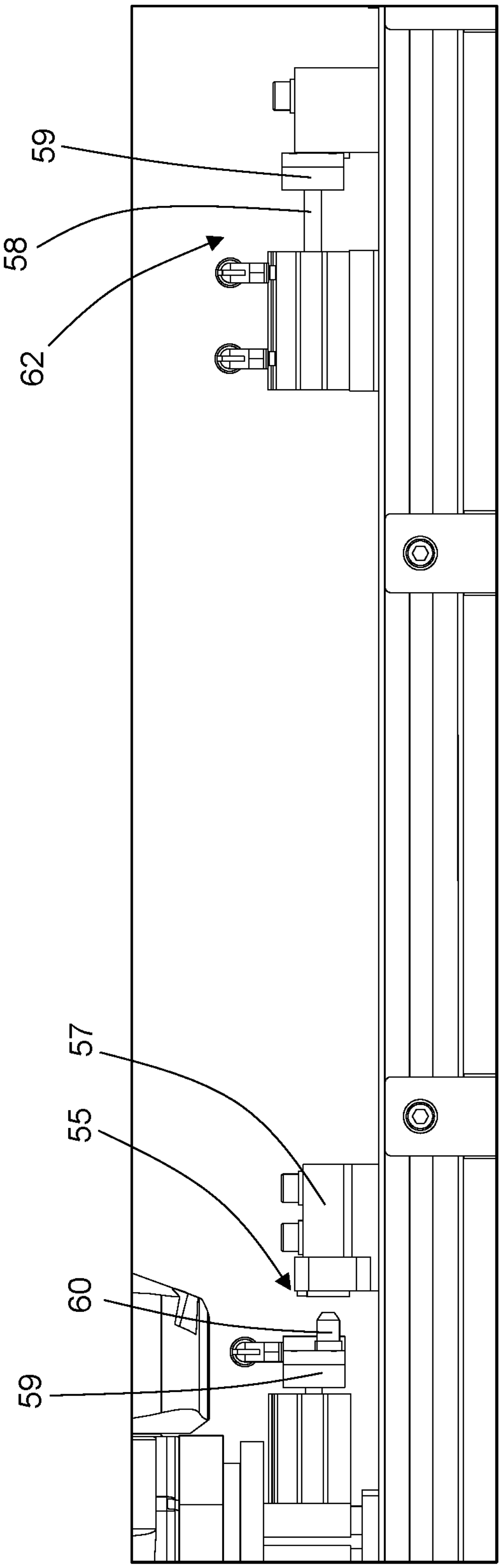

The first active component 56 and the first passive components 57 may be of any typology. However, preferably, the first active component 56 comprises an electro-mechanical, pneumatic or electro-pneumatic hooking unit. For example, in the embodiment illustrated in the accompanying figures, the first active component 56 comprises two first active elements 34 each of which comprises an electro-mechanical, pneumatic or electro-pneumatic hooking unit. In particular, each first active element 34 comprises a piston, a sustaining body 59 coupled to one end of the piston, and a projecting element 60 mounted on the sustaining body 59. Each first passive component 57 in contrast comprises two first passive elements 35 in each of which in contrast a recess 61 is made. When the first active component 56 is in the first active configuration, each piston adopts an extracted configuration and the relative projecting element 60 is inserted inside the recess 61 of one of the first passive elements 35 (FIGS. 17 to 19). When the first active component 56 is in the first inactive configuration, each piston adopts a retracted configuration and the relative projecting element 60 is placed outside the recess 61 (FIG. 20). Advantageously, each first active element 34 comprises a piston which comprises a plurality of rods 58 (three rods 58 in the accompanying figures) and a plurality of projecting elements 60 (for example, two projecting elements 60), whilst a plurality of recesses 61 is made in each first passive element 35 (for example, two recesses 61) their number preferably equal to the number of projecting elements 60. As can be seen in the accompany figures, the pistons of the two first active elements 34 are mounted in such a way as to move in opposite directions, in such a way that when they are in the first active configuration they prevent disengagement of the first passive component 57 from the first active component 56.

The embodiment of the first components described above shall not be understood as limiting, since it is only an example of the possible embodiments.

Advantageously, the housing device 7, 8 comprises a second hooking system 62 comprising a second active component 63, mounted on the first supporting element 31, and a pair of second passive components 64, each of which is mounted on a respective first receiving element (one on the first receiving element of the first typology 32 and the other on that of the second typology 33). In those embodiments, the second active component 63 is switchable between a second inactive configuration and a second active configuration. In the second inactive configuration, the second active component 63 can be associated with (and disassociated from) each second passive component 64. In contrast, in the second active configuration, the second active component 63, if it is associated with a second passive component 64, is fixed to that second passive component 64 for rending the respective first receiving element 32, 33 (the first receiving element 32, 33 on which that second passive component 64 is mounted) integral with the first supporting element 31.

Moreover, preferably, the movement device 30 comprises a third hooking system 65 comprising a third active component 66, mounted on the second supporting element 36, and a pair of third passive components 67, each of which is mounted on a respective second receiving element (one on the second receiving element of the first typology 37 and the other on that of the second typology 39). Advantageously, the third active component 66 is switchable between a third inactive configuration and a third active configuration. In the third inactive configuration, the third active component 66 can be associated with (and disassociated from) each third passive component 67. In contrast, in the third active configuration, the third active component 66, if it is associated with a third passive component 67, is fixed to that third passive component 67 for rendering the respective second receiving element 37, 39 (the second receiving element 37, 39 on which that third passive component 67 is mounted) integral with the second supporting element 36.

Similarly to what was described for the first hooking system 55, the second hooking system 62 and the third hooking system 65 may also be of any typology.

In the embodiment illustrated in the accompanying figures, the second active component 63 and the third active component 66 have a structure similar to the first active component 56, whilst the second passive component 64 and the third passive component 67 have a structure similar to the first passive component 57. For this reason, the second hooking system 62 and the third hooking system 65 will not be described in further detail. It should be emphasised that the embodiment illustrated is only one of the possible embodiments.

Moreover, the further housing device 8, 7, when present, also comprises a fourth hooking system 68 which is of the same typology as the second hooking system 62. Therefore, for this reason, it will not be described in detail (with the appropriate adjustments it is within the reach of people who are expert in the sector).

Advantageously, the housing device 7, 8, the movement device 30 and the further housing device 8, 7 comprise respectively a pair of second active elements 34, a pair of third active elements and a pair of fourth active elements. Each of them also comprises a pair of respective passive components. Advantageously, the second active components 63, the third active components 66 and the fourth active components are mounted respectively on the first supporting element 31, on the second supporting element 36 and on the third supporting element 50, whilst the second, third and fourth passive components are mounted respectively on the first receiving element 32, 33, on the second receiving element 37, 39 and on the third receiving element 51, 52.

Preferably, the second active component 63, the third active component 66 and the fourth active component (if present) also comprise an electro-mechanical, pneumatic or electro-pneumatic hooking unit.

In the preferred embodiments, when the transferring device 10 operates according to the format change-over mode, switching between the first active configuration and the first inactive configuration, and vice versa, allows the movable 41 respectively to uncouple from, and to couple to, the respective receiving elements and the respective gripping elements. For example, the first active component 56 switches its configuration from the first active configuration to the inactive one when the movable arm 41 is in the first storage position for releasing the gripping element 42, 43 in the first free housing 47, and switches its configuration from the first inactive configuration to the active one when the movable arm 41 is in the first removing position for coupling to the first receiving element 32, 33 associated with the first supporting element 31 to remove it. In order to allow the removal, the second active component 63 mounted on the first supporting element 31 switches from the second active configuration to the second inactive configuration. Then, the first active component 56 again switches its configuration from the first active configuration to the inactive one when the movable arm 41 is in the second storage position for releasing in the second free housing 48 the first receiving element 32, 33 removed from the first supporting element 31. What was described above with reference to the first receiving elements 32, 33, may advantageously be applied, with the appropriate adjustments, even in the case of the second receiving elements 37, 39 and, if present, of the third receiving elements 51, 52.

In the accompanying figures, a switch from the first active configuration to the first inactive configuration is visible by comparing FIGS. 19 and 20, whilst a switch from the second active configuration to the second inactive configuration is visible by comparing FIGS. 17 and 18. These figures show what happens when the movable arm 41 is in the first mounting position: with the first receiving element 33, 32 fixed to the movable arm 41 by means of the first hooking system 55, the second active component 63 switches from the second inactive configuration (FIG. 17) to the second active configuration (FIG. 18), rendering the first receiving element 33, 32 also integral with the first supporting element 31; then the first active component 56 switches from the first active configuration (FIG. 19) to the first inactive configuration (FIG. 20), and the movable arm 41 uncouples from the first receiving element 33, 32.

When the transferring device 10 operates according to the transferring mode, all of the active components are in the respective active configuration. In fact, each active component is fixed to a respective passive component for rendering the element on which the passive component is mounted integral with the element on which the active component is mounted.

There follows a general description of an apparatus 3 for capping containers which comprises the conveying unit 1.

That apparatus 3 comprises a supporting frame 69 (which comprises the supporting structure 6 of the conveying unit 1), on which the following are mounted one after another (relative to a movement path of the caps 82): a feeding unit 70, the conveying unit 1 and a capping unit 71.

The feeding unit 70 defines a feeding station for caps 82, and is associated with the conveying unit 1 for feeding the caps 82 to the loading device 9.

In the preferred embodiments, such as that shown in the accompanying figures, the feeding unit 70 comprises a hopper 72, for housing the caps 82, and a conveying system 73.

Advantageously, the hopper 72 has a lower opening 74 for allowing the caps 82 to come out. The outflow of caps 82 can be regulated for example by varying the dimensions of the lower opening 74.

In contrast, preferably, the conveying system 73 is associated with the lower opening 74 of the hopper 72 for receiving from it the caps 82 which come out and for feeding those caps 82 to the loading device 9 of the conveying unit 1. In particular, the conveying system 73 comprises at least one conveyor belt 76. Advantageously, that conveyor belt 76 extends at least as far as the loading station 4 where the loading device 9 operates.

Preferably, the apparatus 3 also comprises an electronic system for watching the caps 82, which is configured to watch the caps 82 positioned on the conveyor belt 76 and to determine the position and orientation of that cap 82 (initial orientation). The cap 82 watching system, which may be part of an electronic control unit of the whole apparatus 3, generates the information necessary for the loading device 9 to correctly pick up the cap 82 from the conveyor belt 76 and to perform the cap rotation necessary in order to obtain the predefined orientation in the first seats 11 or in the second seats 12. Preferably, the cap 82 watching system comprises a vision device, for example a video camera, and an electronic processing unit. In this case, the video camera is configured to capture the image of the cap 82, whilst the electronic processing unit is configured to receive the image from the vision device and to process it in order to determine the necessary information.

In the embodiment shown in the accompanying figures, the conveying system 73 comprises a plurality of conveyors. In particular, a lifter 78 is associated with the opening of the hopper 72 for receiving the caps 82, lifting them along an inclined path and making them fall onto an intermediate belt 77 which then feeds them by allowing them to fall onto the conveyor belt 76 associated with the loading station 4.

Preferably, the feeding unit 70 comprises two hoppers 72 side by side and two conveying systems 73 which are laterally spaced apart from each other and which are each configured to feed the caps 82 to one of the robots of the pick and place type 24, 25. Advantageously, the apparatus 3 also comprises a recirculating conveyor belt 79 which is placed between the two conveying systems 73 and which is associated with the hopper 72. The recirculating conveyor belt 79 is configured to receive the caps 82 which have fallen onto it from the other conveyor belts (since they went beyond the loading station 4 without having been picked up by the loading device 9) and to feed them to the hopper 72 again.

It should be emphasised that what was described with reference to the conveying system 73 shall not be considered limiting for this invention. In fact, it is possible that the caps 82 are fed to the loading device 9 in other ways than that described and shown in FIG. 1.

Downstream of the conveying unit 1 the apparatus 3 comprises the capping unit 71 which defines the capping station for the containers and which is associated with the conveying unit 1 for receiving the caps 82 from the transferring device 10 (which is part of the conveying unit 1) and for capping the containers with those caps 82.

Advantageously, in the embodiment illustrated the capping unit 71 comprises the movement device 30 and a plurality of capping devices 80.

Preferably, the movement device 30 is movable (in the embodiment illustrated by means of the movement of the second supporting element 36) relative to the supporting frame 69 between a receiving position and a capping position. When the movement device 30 is in the receiving position (FIG. 6), the movement device 30 is associated with the transferring device 10 for receiving the caps 82. When the movement device 30 is in the capping position (FIG. 7), in contrast, the movement device 30 is positioned in the capping station.

The capping devices 80 are advantageously positioned at the capping station and are configured to cap the containers with the caps 82. Moreover, the capping devices 80 are associated with the movement device 30 when the movement device 30 is in the capping position.

Advantageously, the capping unit 71 comprises a number of capping devices 80 which is equal to the number of first seats 11 and to the number of second seats 12 and, preferably, to the number of housing compartments 38, 40 of the movement device 30.

Figure 7:
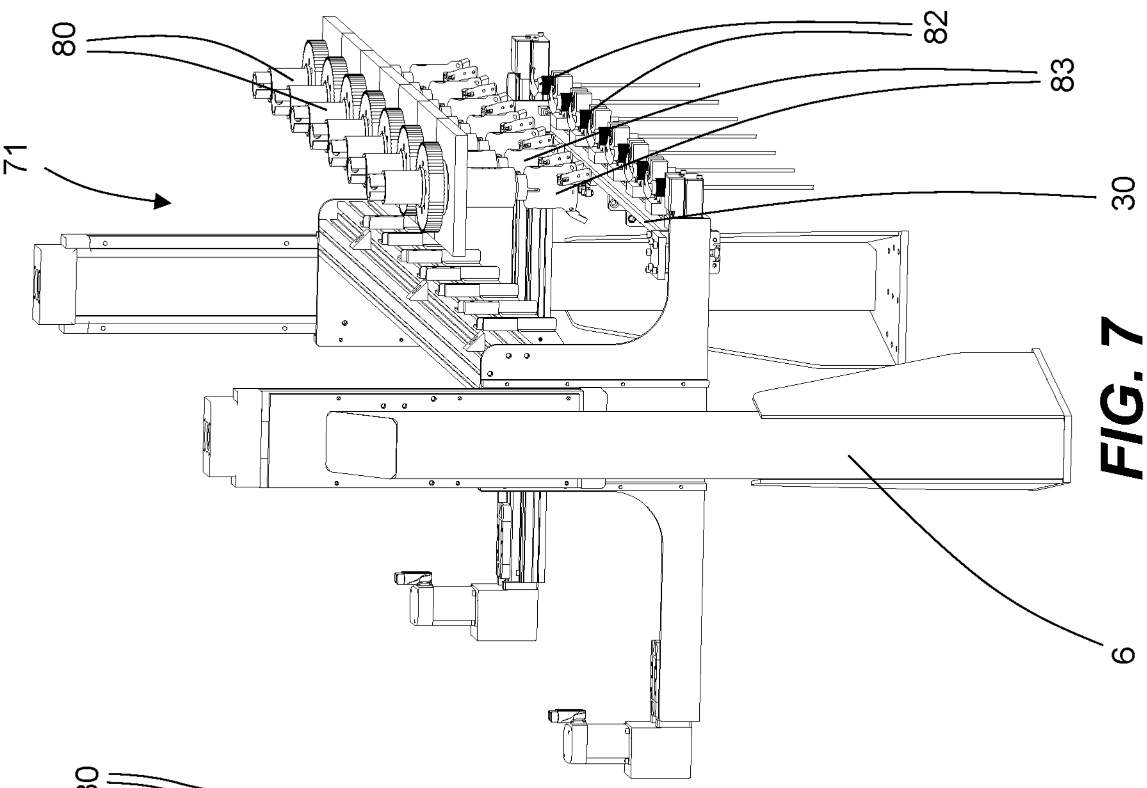
FIG. 7 shows, in an axonometric view, the movement device of FIG. 6 in a capping position.
Figure 6:
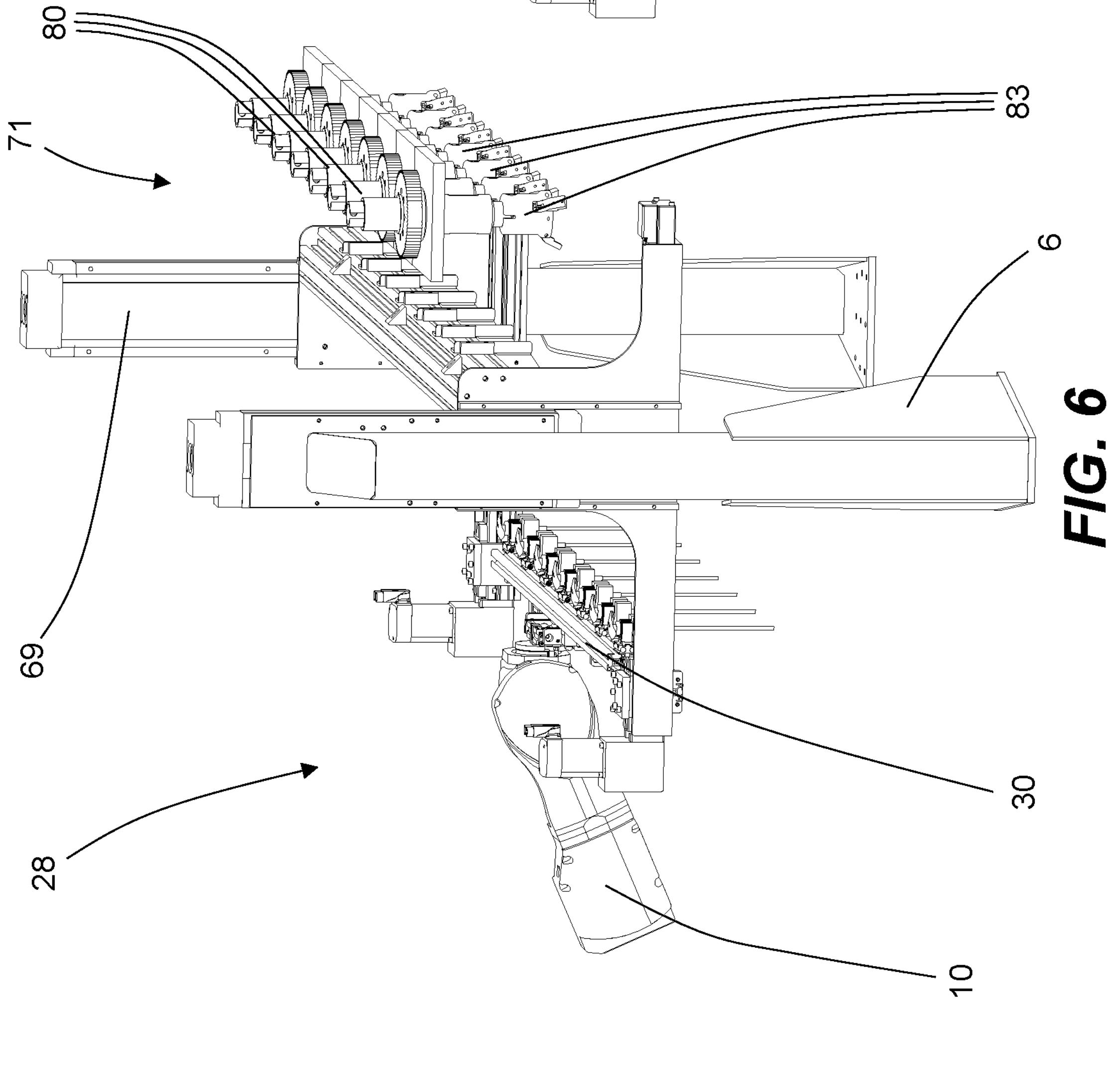
FIG. 6 shows, in an axonometric view, a movement device which is part of the apparatus of FIG. 1, in a receiving position.

In the preferred embodiments, each capping device 80 comprises a capping head 83 as can be seen in FIGS. 6 and 7. Those capping heads 83 are advantageously positioned above the movement device 30 when the same movement device 30 is in the capping position and are configured to pick up the caps 82 from the movement device 30 and to apply them to the containers (in particular after the movement device 30 has moved away from the capping position).

There follows a general description of an apparatus 3 for capping containers comprising the transferring unit 2 according to this invention.

That apparatus 3 comprises a supporting frame 69 (which comprises the supporting structure 6 of the transferring unit 1), on which the following are mounted one after another (relative to a movement path of the caps 82): a unit for preparing caps 82 and a plurality of capping devices 80.

The unit for preparing caps 82 is coupled to the supporting frame 69 and is configured to load the caps 82 in the seats 11, 12 of the housing device 7, 8 (or of the housing devices) of the transferring unit 2. The capping devices 80 are positioned at a capping station, are configured to cap the containers with the caps 82, and are associated with the movement device 30 for receiving the caps 82 from the movement device 30.

A possible embodiment of the unit for preparing caps 82 comprises the feeding unit 70 of the type previously described and the loading device 9 (irrespective of whether or not the seats 11, 12 it loads are movable).

Moreover, advantageously, the movement device 30 is movable relative to the supporting frame 69 between the receiving position (FIG. 6) and the capping position (FIG. 7), in the ways described above, in which the movement device 30 is associated with the capping devices 80 for feeding the caps 82 to the capping devices 80. The capping devices 80 are also advantageously made as described above.

As already indicated above, what has been described so far relative to each of the two embodiments of the apparatus 3 for capping containers which relate to the two main innovative aspects of this invention, can be implemented simultaneously in the preferred embodiment illustrated in the accompanying figures.

In that embodiment, the apparatus 3 for capping containers advantageously comprises, one after another, the feeding unit 70, the conveying unit 1, the transferring unit 2 and the capping devices 80 positioned at the capping station, as can be seen in FIG. 1.

In these embodiments, the conveying unit 1 and the transferring unit 2 are closely linked to each other by the presence of shared elements which act as an interface. For example, both the housing devices 7, 8 and the transferring device 10 are part of both the conveying unit 1 and the transferring unit 2. Finally, this invention relates to a method for conveying caps which is advantageously implemented in the operation of the conveying unit 1 described above.

That method comprises a plurality of cyclically repeated steps. The method initially comprises a first positioning step, in which a first group of caps 82 is positioned inside first seats 11 which are placed at a loading station 4. The positioning is performed by inserting each cap 82 of the first group into a respective first seat 11. Moreover, the method comprises a first movement step performed after the first positioning step, in which the first seats 11 are moved from the loading station 4 to a pick-up station 5, and a second movement step, in which second seats 12 are moved from the pick-up station to the loading station 4.

According to an innovative aspect of the method, it comprises a second positioning step performed after the first positioning step and after the second movement step, and a first pick-up step carried out during the second positioning step. In the second positioning step a second group of caps 82 is positioned inside the second seats 12 placed at the loading station 4. That positioning is performed by inserting each cap 82 of the second group into a respective second seat 12. In contrast, in the first pick-up step, the caps 82 of the first group are picked up from the first seats 11, placed in the pick-up station 5, for feeding them to a processing unit placed downstream, such as a capping unit 71.

The method also comprises a third movement step performed after the second positioning step, a fourth movement step performed after the first pick-up step, and a second pick-up step, carried out during a subsequent execution of the first positioning step.

In the third movement step the second seats 12 are moved from the loading station 4 to the pick-up station 5, and in the fourth movement step the first seats 11 are moved from the pick-up station 5 to the loading station 4. Finally, in the second pick-up step the caps 82 of the second group are picked up from the second seats 12 placed in the pick-up station 5 for feeding them to the processing unit.

From the second pick-up step, the steps described above are cyclically repeated. In fact, as already indicated, the second pick-up step is carried out during a new execution of the first positioning step.

It should be emphasised that in the preferred embodiments, the method is implemented by performing the steps described in the order indicated. However, it is possible that the steps may be performed in an order that is partly different from the one described above, for example in accordance with the different operating variants described above relative to the conveying unit 1.

This invention brings important advantages.

In fact, thanks to this invention, it was possible to make a transferring unit for transferring caps and an apparatus for capping containers comprising that unit, which allow format change-over operations to be performed in a simple and fast way and which therefore guarantee higher productivity than the prior art solutions.

Finally, it should be noticed that this invention is relatively easy to produce and that even the cost linked to implementing the invention is not very high. The invention described above may be modified and adapted in several ways without thereby departing from the scope of the inventive concept.

All details may be substituted with other technically equivalent elements and the materials used, as well as the shapes and dimensions of the various components, may vary according to requirements.

What is claimed is:

1. A transferring unit for transferring caps from a pick-up station to an unloading station, comprising:

a supporting structure;

a magazine which defines a plurality of housings, mounted on the supporting structure;

a housing device, mounted on the supporting structure, which comprises:

a first supporting element;

a first receiving element of a first typology, which defines a first plurality of seats, each of which is configured to house in use a cap of a first type;

a first receiving element of a second typology, which defines a second plurality of seats, each of which is configured to house in use a cap of a second type;

wherein the first receiving element of the first typology and the first receiving element of the second typology are alternatively removably mountable on the first supporting element and are interchangeable;

a movement device mounted on the supporting structure at the unloading station, which comprises:

a second supporting element, movable relative to the supporting structure;

a second receiving element of a first typology, which defines a first plurality of housing compartments each of which is configured to receive in use the cap of the first type;

a second receiving element of a second typology, which defines a second plurality of housing compartments each of which is configured to receive in use the cap of the second type;

wherein the second receiving element of the first typology and the second receiving element of the second typology are alternatively removably mountable on the second supporting element and are interchangeable; and a transferring device mounted on the supporting structure and operating between the pick-up station and the unloading station, comprising:

a movable arm, movable relative to the supporting structure, the movable arm moreover being removably couplable both to the first receiving element of the first typology and the first receiving element of the second typology, and to the second receiving element of the first typology and the second receiving element of the second typology; and a gripping element, configured to retain in use a plurality of caps;

wherein the transferring unit is switchable between a working configuration and a format change-over configuration, in the working configuration the housing device, being placed in the pick-up station, one of the first receiving element of the first typology, and the first receiving element of the second typology being associated with the first supporting element and the other one of the first receiving element of the first typology and the first receiving element of the second typology, being housed in a respective first housing, and one of the second receiving element of the first typology, and the second receiving element of the second typology being associated with the second supporting element and the other one of the second receiving element of the first typology and the second receiving element of the second typology, being housed in a respective second housing; wherein the one of the first receiving element of the first typology, and the first receiving element of the second typology which is associated with the first supporting element, the one of the second receiving element of the first typology, and the second receiving element of the second typology which is associated with the second supporting element and the gripping element, which is associated with the movable arm all being configured for caps of the same type;

and wherein:

when the transferring unit is in the working configuration, the transferring device in use operates according to a transferring mode in which the transferring device is moved for picking up the caps from, respectively, the first plurality of seats, or the second plurality of seats of said one of the first receiving element of the first typology, and the first receiving element of the second typology which is associated with the first supporting element and for positioning in use said caps in, respectively, the first plurality of housing compartments, or the second plurality of housing compartments of the one of the second receiving element of the first typology, and the second receiving element of the second typology which is associated with the second supporting element; and when the transferring unit is in the format change-over configuration, the transferring device in use operates according to a format change-over mode in which the movable arm is moved for swapping over the one of the first receiving element of the first typology, and the first receiving element of the second typology which is associated with the first supporting element and the one of the first receiving element of the first typology and the first receiving element of the second typology, which is placed in the respective first housing, and for swapping over the one of the second receiving element of the first typology, and the second receiving element of the second typology which is associated with the second supporting element and the one of the second receiving element of the first typology, and the second receiving element of the second typology which is placed in the respective second housing.

2. The transferring unit according to claim 1, wherein, when the transferring device operates according to the format change-over mode, the movable arm moves between the following positions:

- a first storage position, which the movable arm adopts first, in which the movable arm is associated with the magazine for releasing, in a first free housing, the gripping element, associated with the movable arm;
- a first removing position, in which the movable arm is associated with the housing device, for coupling to, and removing from the first supporting element, the one of the first receiving element of the first typology, and the first receiving element of the second typology which is associated with the first supporting element and for removing that first receiving element, from the first supporting element;
- a second storage position, in which the movable arm is associated with the magazine for releasing, in a second free housing, the one of the first receiving element of the first typology, and the first receiving element of the second typology which has been removed from the first supporting element;
- a first pick-up position, in which the movable arm is associated with the magazine for coupling to, and picking up from the respective first housing, the other one of the first receiving element of the first typology and the first receiving element of the second typology,
- a first mounting position, in which the movable arm is associated with the first supporting element for mounting on the first supporting element the other one of the first receiving element of the first typology and the first receiving element of the second typology, which has been picked up from the respective first housing;
- a second removing position, in which the movable arm is associated with the movement device for coupling to, and removing from the second supporting element, the one of the second receiving element of the first typology, and the second receiving element of the second typology which is associated with the second supporting element;
- a third storage position, in which the movable arm is associated with the magazine for releasing, in a third free housing, the one of the second receiving element of the first typology, and the second receiving element of the second typology which has been removed from the second supporting element;
- a second pick-up position, in which the movable arm is associated with the magazine for coupling to, and picking up from the respective second housing, the other one of the second receiving element of the first typology and the second receiving element of the second typology;
- a second mounting position, in which the movable arm is associated with the second supporting element for mounting on the second supporting element the other one of the second receiving element of the first typology and the second receiving element of the second typology which has been picked up from the respective second housing; and
- a gripping position, which the movable arm adopts last, in which the movable arm is associated with the magazine for again coupling to the gripping element, and for picking up the gripping element.

3. The transferring unit according to claim 1, wherein, the transferring device comprises a gripping element of a first typology, configured to retain in use a plurality of caps of the first type and a gripping element of a second typology, configured to retain in use a plurality of caps of the second type, wherein moreover the gripping element of the first typology and the gripping element of the second typology are alternatively removably mountable on the movable arm and are interchangeable, wherein in the working configuration one of the gripping element of the first typology and the gripping element of the second typology, is associated with the movable arm and the other one of the gripping element of the first typology and the gripping element of the second typology, is housed in a respective third housing, and wherein, when the transferring device in use operates according to the format change-over mode, the movable arm is also moved for swapping over the one of the gripping element of the first typology and the gripping element of the second typology, which is associated with the movable arm and the one of the gripping element of the first typology and the gripping element of the second typology, which is placed in the respective third housing.

4. The transferring unit according to claim 3, wherein, when the transferring device operates according to the format change-over mode, the movable arm moves between the following positions:

- a first storage position, which the movable arm adopts first, in which the movable arm is associated with the magazine for releasing, in a first free housing, the one of the gripping element of the first typology and the gripping element of the second typology, which is associated with the movable arm;
- a first removing position, in which the movable arm is associated with the housing device, for coupling to, and for removing from the first supporting element, the one of the first receiving element of the first typology, and the first receiving element of the second typology which is associated with the first supporting element;
- a second storage position, in which the movable arm is associated with the magazine for releasing, in a second free housing, the one of the first receiving element of the first typology, and the first receiving element of the second typology which has been removed from the first supporting element;
- a first pick-up position, in which the movable arm is associated with the magazine for coupling to, and for picking up from the respective first housing, the other one of the first receiving element of the first typology and the first receiving element of the second typology;
- a first mounting position, in which the movable arm is associated with the first supporting element for mounting on the first supporting element the other one of the first receiving element of the first typology and the first receiving element of the second typology, which has been picked up from the respective first housing;
- a second removing position, in which the movable arm is associated with the movement device for coupling to, and for removing from the second supporting element, the one of the second receiving element of the first typology, and the second receiving element of the second typology which is associated with the second supporting element;
- a third storage position, in which the movable arm is associated with the magazine for releasing, in a third free housing, the one of the second receiving element of the first typology, and the second receiving element of the second typology which has been removed from the second supporting element;

a second pick-up position, in which the movable arm is associated with the magazine for coupling to, and for picking up from the respective second housing, the other one of the second receiving element of the first typology and the second receiving element of the second typology;

a second mounting position, in which the movable arm is associated with the second supporting element for mounting on the second supporting element the other one of the second receiving element of the first typology and the second receiving element of the second typology which has been picked up from the respective second housing; and a gripping position, which the movable arm adopts last, in which the movable armis associated with the magazine for coupling to, and for picking up from the respective third housing, the other one of the gripping element of the first typology and the gripping element of the second typology.

5. The transferring unit according to claim 1, also comprising a further housing device, mounted on the supporting structure, which comprises: a third supporting element, movable relative to the supporting structure; a third receiving element of a first typology, which defines a third plurality of seats, each of which is configured to house in usethe cap of the first type; a third receiving element of a second typology which defines a fourth plurality of seats, each of which is configured to house in usethe cap of the second type; wherein the third receiving element of the first typology and the third receiving element of the second typology are alternatively removably mountable on the third supporting element and are interchangeable;

wherein:

the movable arm is also couplable to the third receiving element of the first typology, and to the third receiving element of the second typology;

in the working configuration of the transferring unit one of the third receiving element of the first typology, and the third receiving element of the second typology being associated with the third supporting element and the other one of the third receiving element of the first typology and the third receiving element of the second typology, being housed in a respective fourth housing; the one of the third receiving element of the first typology, and the third receiving element of the second typology which is associated with the third supporting element, being configured for caps of the same type as the one of the first receiving element of the first typology, and the first receiving element of the second typology which is associated with the first supporting element;

the housing device, and the further housing device, are movable relative to each other between a first operating configuration, in which the housing device, is in the pick-up station and the further housing device, is spaced from the pick-up station, and a second operating configuration, in which the further housing device, is in the pick-up station and the housing device, is spaced from the pick-up station;

when the transferring device operates according to the transferring mode, the transferring device is moved for picking up in usethe caps from, respectively, the first plurality of seats, or the second plurality of seats of said one of the first receiving element of the first typology, and the first receiving element of the second typology which is associated with the first supporting element, when the housing device, and the further housing device, are in the first operating configuration, and from the seats, of said one of the third receiving element of the first typology, and the third receiving element of the second typology which is associated with the third supporting element, when the housing device and the further housing device, are in the second operating configuration, and for positioning in use said caps in, respectively, the first plurality of housing compartments, or the second plurality of housing compartments of the one of the second receiving element of the first typology, and the second receiving element of the second typology which is associated with the second supporting element; and when the transferring device operates according to the format change-over mode, the movable arm in use is moved for also swapping over the one of the third receiving element of the first typology, and the third receiving element of the second typology which is associated with the third supporting element and the one of the third receiving element of the first typology, and the third receiving element of the second typology which is placed in the respective fourth housing.

6. The transferring unit according to claim 5, wherein when the transferring device operates according to the format change-over mode, the movable arm also adopts the following positions, after the first storage position and before the gripping position:

a third removing position, in which the movable arm is associated with the further housing device, for coupling to, and for removing from the third supporting element, the one of the third receiving element of the first typology, and the third receiving element of the second typology which is associated with the third supporting element;

a fourth storage position, in which the movable arm is associated with the magazine for releasing, in a fourth free housing, the one of the third receiving element of the first typology, and the third receiving element of the second typology which has been removed from the third supporting element;

a third pick-up position, in which the movable arm is associated with the magazine for coupling to, and for picking up from the respective fourth housing, the other one of the third receiving element of the first typology and the third receiving element of the second typology; and a third mounting position, in which the movable arm is associated with the third supporting element for mounting on the third supporting element the other one of the third receiving element of the first typology and the third receiving element of the second typology, which has been picked up from the respective fourth housing.

7. The transferring unit according to claim 1, wherein the movable arm comprises an anthropomorphic robot or a non-anthropomorphic robot.

8. The transferring unit according to claim 1, also comprising a first hooking system which comprises a first active component, which is mounted on the movable arm, and a plurality of first passive components, a first passive component of said plurality of first passive components being mounted on each of the first receiving element of the first typology, the first receiving element of the second typology, the second receiving element of the first typology and the second receiving element of the second typology and on each gripping element, and wherein the first active component is switchable between a first inactive configuration in which the first active component is associable with, and dissociable from, each first passive component of said plurality of first passive components, and a first active configuration in which, if the first active component is associated with a first passive component of said plurality of first passive components, the first active component is fixed to that first passive component for rendering the respective element integral with the movable arm.

9. The transferring unit respectively according to claim 8, wherein respectively the first active component, the second active component and/or the third active component comprise an electro-mechanical hooking unit, a pneumatic hooking unit or an electro-pneumatic hooking unit.

10. The transferring unit according to claim 1, wherein the housing device, comprises a second hooking system which comprises a second active component, which is mounted on the first supporting element, and a pair of second passive components, each of which is mounted on a respective one of the first receiving element of the first typology, and the first receiving element of the second typology, and wherein the second active component is switchable between a second inactive configuration in which the second active component is associable with, and dissociable from, each second passive component, and a second active configuration in which, if the second active component is associated with a second passive component, the second active component is fixed to that second passive component for rendering the respective one of the first receiving element of the first typology, and the first receiving element of the second typology integral with the first supporting element.

11. The transferring unit according to claim 1, wherein the movement device comprises a third hooking system which comprises a third active component, which is mounted on the second supporting element, and a pair of third passive components, each of which is mounted on a respective one of the second receiving element of the first typology, and the second receiving element of the second typology, and wherein the third active component is switchable between a third inactive configuration in which it can be associated the third active component is associable with, and dissociable from, each third passive component, and a third active configuration in which, if the third active component is associated with a third passive component, the third active component is fixed to that third passive component for rendering the respective one of the second receiving element of the first typology, and the second receiving element of the second typology integral with the second supporting element.

12. The transferring unit according to claim 1, wherein the transferring device comprises a plurality of gripping units each of which is configured to retain a respective cap, the transferring device being configured to pick up from, respectively, the first plurality of seats, or the second plurality of seats- all of the caps together, wherein the number of seats of, respectively, the first plurality of seats, and the second plurality of seats is equal to the number of housing compartments of, respectively, the first plurality of housing compartments, and the second plurality of housing compartments and to the number of gripping units.

13. An apparatus for capping containers, comprising:

a supporting frame;

a transferring unit according to claim 1, said supporting frame comprising the supporting structure of the transferring unit;

a unit for preparing caps coupled to the supporting frame, which is configured to load in use the caps in, respectively, the first plurality of seats, or the second plurality of seats; and a plurality of capping devices positioned at a capping station, which are configured to cap, in use, the containers with said caps, and which are associated with the movement device for receiving, in use, the caps from the movement device.

14. The apparatus according to claim 13, wherein the movement device is also movable relative to the supporting frame between a receiving position in which the movement device is associated with the transferring device for receiving in use said caps, and a capping position, in which the movement device is associated with the capping devices for feeding the caps to the capping devices.

* * * * *